United States Patent
An et al.

(10) Patent No.: US 8,433,631 B1
(45) Date of Patent: Apr. 30, 2013

(54) METHOD AND SYSTEM FOR ASSESSING LOAN CREDIT RISK AND PERFORMANCE

(75) Inventors: Mark Y. An, North Potomac, MD (US); Cristian A. De Ritis, Washington, DC (US); Eric L. Rosenblatt, Derwood, MD (US)

(73) Assignee: Fannie Mae, Washington, DC (US)

( * ) Notice: Subject to any disclaimer, the term of this patent is extended or adjusted under 35 U.S.C. 154(b) by 59 days.

(21) Appl. No.: 13/016,826

(22) Filed: Jan. 28, 2011

Related U.S. Application Data

(63) Continuation of application No. 10/816,496, filed on Apr. 1, 2004, now Pat. No. 7,881,994.

(60) Provisional application No. 60/502,131, filed on Sep. 11, 2003, provisional application No. 60/516,822, filed on Nov. 3, 2003.

(51) Int. Cl.
*G06Q 40/00* (2012.01)

(52) U.S. Cl.
USPC .............................. 705/35; 705/36 R; 705/38

(58) Field of Classification Search .................. 717/104; 705/35, 36 R, 38
See application file for complete search history.

(56) References Cited

U.S. PATENT DOCUMENTS

| | | |
|---|---|---|
| 1,788,084 A | 1/1931 | Curtis |
| 4,044,694 A | 8/1977 | Wylie |
| 4,302,016 A | 11/1981 | Astle et al. |
| 4,483,255 A | 11/1984 | Collier et al. |
| 4,557,486 A | 12/1985 | Stuckmayer |
| 4,774,664 A | 9/1988 | Campbell et al. |
| 4,820,086 A | 4/1989 | Kieronski |
| 4,876,648 A | 10/1989 | Lloyd |
| 4,914,587 A | 4/1990 | Clouse |
| 4,974,878 A | 12/1990 | Josephson |
| 4,992,939 A | 2/1991 | Tyler |
| 5,231,571 A | 7/1993 | Agostino |

(Continued)

FOREIGN PATENT DOCUMENTS

| | | |
|---|---|---|
| CA | 2086269 A | 6/1994 |

OTHER PUBLICATIONS

Carl W. Helstrom, Probability and Stochastic Processes for Engineers, 1991, Macmillan Publishing Company, Second Edition, pp. 113.*

(Continued)

*Primary Examiner* — Ella Colbert
*Assistant Examiner* — Scott S Trotter
(74) *Attorney, Agent, or Firm* — Foley & Lardner LLP

(57) ABSTRACT

A method and system for evaluating the performance of a study group of loans relative to the performance of a control group of loans is presented. The described method includes determining a study group and a control group from a portfolio of individual loans, determining a set of control variables associated with each of the individual loans included in the study group and the control group, partitioning the control group into one or more cells based on the set of control variables, calculating an estimated performance value for each of the individual loans in the study group based on the cells; and calculating a performance difference for the study group. The performance difference has a standard normal distribution with zero mean which allows statistical significance to be estimated using standard probability tables. The control group may either include or exclude the individual loans in the study group to eliminate inaccuracies.

26 Claims, 5 Drawing Sheets

U.S. PATENT DOCUMENTS

| | | |
|---|---|---|
| 5,245,536 A | 9/1993 | Hsieh |
| 5,323,315 A | 6/1994 | Highbloom |
| 5,352,121 A | 10/1994 | Schmitz et al. |
| 5,383,113 A | 1/1995 | Kight et al. |
| 5,481,647 A | 1/1996 | Brody et al. |
| 5,491,817 A | 2/1996 | Gopal et al. |
| 5,547,226 A | 8/1996 | Wentworth |
| 5,600,114 A | 2/1997 | Dunlap et al. |
| 5,644,726 A | 7/1997 | Oppenheimer |
| 5,644,727 A | 7/1997 | Atkins |
| 5,742,775 A | 4/1998 | King |
| 5,774,884 A | 6/1998 | Watanabe et al. |
| 5,852,811 A | 12/1998 | Atkins |
| 5,875,437 A | 2/1999 | Atkins |
| 5,907,828 A | 5/1999 | Meyer et al. |
| 5,933,817 A | 8/1999 | Hucal |
| 5,940,812 A | 8/1999 | Tengel et al. |
| 5,983,206 A | 11/1999 | Oppenheimer |
| 5,995,947 A | 11/1999 | Fraser et al. |
| 6,012,047 A | 1/2000 | Mazonas et al. |
| 6,070,151 A | 5/2000 | Frankel |
| 6,078,905 A | 6/2000 | Pich-LeWinter |
| 6,119,103 A | 9/2000 | Basch et al. |
| 6,148,293 A | 11/2000 | King |
| 6,185,543 B1 | 2/2001 | Galperin et al. |
| 6,233,566 B1 | 5/2001 | Levine et al. |
| 6,249,775 B1 | 6/2001 | Freeman et al. |
| 6,430,545 B1 | 8/2002 | Honarvar et al. |
| 6,456,983 B1 | 9/2002 | Keyes et al. |
| 6,460,021 B1 | 10/2002 | Kirksey |
| 6,684,192 B2 | 1/2004 | Honarvar et al. |
| 6,901,384 B2 | 5/2005 | Lynch et al. |
| 6,988,082 B1 | 1/2006 | Williams et al. |
| 7,003,491 B2 | 2/2006 | Starkman |
| 7,020,631 B2 | 3/2006 | Freeman et al. |
| 7,031,936 B2 * | 4/2006 | Johnson et al. ............. 705/36 R |
| 7,039,608 B2 * | 5/2006 | Johnson et al. ............. 705/36 R |
| 7,099,843 B1 | 8/2006 | Cassidy et al. |
| 7,107,241 B1 | 9/2006 | Pinto |
| 7,124,104 B2 | 10/2006 | Casciano et al. |
| 7,165,043 B2 | 1/2007 | Keyes et al. |
| 7,188,084 B2 | 3/2007 | Starkman |
| 7,277,869 B2 | 10/2007 | Starkman |
| 7,310,618 B2 | 12/2007 | Libman |
| 7,392,221 B2 * | 6/2008 | Nabe et al. ...................... 705/38 |
| 2001/0027440 A1 | 10/2001 | Tanaka et al. |
| 2001/0029477 A1 | 10/2001 | Freeman et al. |
| 2001/0032158 A1 | 10/2001 | Starkman |
| 2001/0044765 A1 | 11/2001 | Wolberg |
| 2001/0054022 A1 | 12/2001 | Louie et al. |
| 2002/0019790 A1* | 2/2002 | Edgar et al. ...................... 705/36 |
| 2002/0019804 A1 | 2/2002 | Sutton |
| 2002/0035530 A1 | 3/2002 | Ervolini et al. |
| 2002/0040339 A1 | 4/2002 | Dhar et al. |
| 2002/0052836 A1 | 5/2002 | Galperin et al. |
| 2002/0073020 A1 | 6/2002 | McFarland et al. |
| 2002/0077968 A1 | 6/2002 | Kaniwa et al. |
| 2002/0111901 A1 | 8/2002 | Whitney |
| 2002/0120557 A1 | 8/2002 | Chien |
| 2002/0138415 A1 | 9/2002 | Siska |
| 2003/0009418 A1 | 1/2003 | Green et al. |
| 2003/0018558 A1 | 1/2003 | Heffner et al. |
| 2003/0028479 A1 | 2/2003 | Kirksey |
| 2003/0033242 A1 | 2/2003 | Lynch et al. |
| 2003/0036996 A1 | 2/2003 | Lazerson |
| 2003/0093342 A1 | 5/2003 | Hillman et al. |
| 2003/0093365 A1 | 5/2003 | Halper et al. |
| 2003/0093366 A1 | 5/2003 | Halper et al. |
| 2003/0120566 A1 | 6/2003 | Lipschutz et al. |
| 2003/0130934 A1 | 7/2003 | Saunders |
| 2003/0135448 A1 | 7/2003 | Aguias et al. |
| 2003/0135450 A1 | 7/2003 | Aguais et al. |
| 2003/0149603 A1 | 8/2003 | Ferguson et al. |
| 2003/0172025 A1 | 9/2003 | Gallina |
| 2003/0225659 A1 | 12/2003 | Breeden et al. |
| 2004/0030629 A1 | 2/2004 | Freeman et al. |
| 2004/0030638 A1 | 2/2004 | Dwin |
| 2004/0054620 A1 | 3/2004 | Bykhovsky |
| 2004/0054621 A1 | 3/2004 | Bretvin |
| 2004/0153407 A1 | 8/2004 | Clubb et al. |
| 2004/0177030 A1 | 9/2004 | Shoham |
| 2004/0225594 A1 | 11/2004 | Nolan et al. |
| 2004/0254878 A1 | 12/2004 | Fitzsimmons et al. |
| 2005/0010506 A1 | 1/2005 | Bachann |
| 2005/0027626 A1 | 2/2005 | Garcia |
| 2005/0203779 A1 | 9/2005 | Prieston |
| 2005/0203830 A1 | 9/2005 | Prieston |
| 2005/0203831 A1 | 9/2005 | Prieston |
| 2005/0203832 A1 | 9/2005 | Prieston |
| 2005/0262013 A1 | 11/2005 | Guthner et al. |
| 2006/0015421 A1 | 1/2006 | Grimberg |
| 2006/0059073 A1 | 3/2006 | Walzak |
| 2006/0080202 A1 | 4/2006 | Ireland et al. |
| 2006/0195391 A1 | 8/2006 | Stanelle |
| 2006/0242047 A1 | 10/2006 | Haggerty et al. |
| 2006/0271472 A1 | 11/2006 | Cagan |
| 2007/0027791 A1 | 2/2007 | Young et al. |
| 2007/0043654 A1 | 2/2007 | Libman |
| 2007/0055595 A1 | 3/2007 | Keyes et al. |
| 2007/0061248 A1 | 3/2007 | Shavit et al. |
| 2007/0118391 A1 | 5/2007 | Malaney et al. |
| 2007/0118393 A1 | 5/2007 | Rosen et al. |
| 2007/0136186 A1 | 6/2007 | Libman |
| 2007/0136187 A1 | 6/2007 | Libman |
| 2007/0239581 A1 | 10/2007 | Eder |
| 2007/0288271 A1 | 12/2007 | Klinkhammer |

OTHER PUBLICATIONS

"Countrywide Adds Subprime Automated Underwriting to CWBC", May 24, 2000, PR Newswire, 2 pages.

"Fannie Mae Pledges to Help Raise Minority Homeownership", Jan. 27, 2000, PR Newswire, 4 pages.

"In Brief: Fannie Updates Underwriting Program", American Banker, New York, NY: Jul. 19, 2000, vol. 165, Iss. 137, p. 10, 1 page.

"Wal-Mart's Earnings Rise 26 Percent; Results beat Analysts" Estimates by One Cent; [Five Star Lift Edition], St. Louis Post-Dispatch, St. Louis, MO., Aug. 14, 2002, p. C. 17, downloaded from the internet May 26, 2007, www.proquest.umi.com/pqdweb?index=21&sid=1&srchmode=1&vinst-PROD&fmt, 2 pages.

"Taking the Mystery Out of Your Mortgage," Fannie Mae, 2000, 19 pages.

Berkovek, et al., "Discrimination, Competition and Loan Performance in FHA Mortgage Lending," The REview of Economics and Statistics, May 1998, pp. 241-250, vol. 80, No. 2, 11 pages.

Fabozzi et al., "The Handbook of Nonagency Mortgage-Back Securities", by Frank J. Fabozzi, Ph.D., CFA, CPA, Chuck Ramsey (2000), p. 305, 3 pages.

Harney, K., "Measures for the Borrowers Need to Know", Aug. 25, 2001, The Washington Post, pp. 1-3, 3 pages.

Kenneth R. Harney et al, "Finding creditworthiness in special circumstances", May 16, 2004, Chicago Tribune, p. 2, 3 pages.

LaCour-Little, M. et al., "Improving Parametric Mortgage Prepayment Models with Non-parametric Kernel Regression". The Journal of Real Estate Research, Nov./Dec. 2002, pp. 299-312, 14 pages.

Mitchell, K., "Interest Rate Risk at Commercial banks: An Empirical Investigation," The Financial Review, Aug. 1989, pp. 431-455, vol. 24, No. 3, 25 pages.

Notice of Allowance on U.S. Appl. No. 10/816,496, mail date Oct. 28, 2010, 4 pages.

Office Action on U.S. Appl. No. 10/816,497, mail date Aug. 14, 2008, 15 pages.

Office Action on U.S. Appl. No. 10/816,497, mail date Dec. 28, 2007, 13 pages.

Office Action on U.S. Appl. No. 10/816,497, mail date Feb. 18, 2009, 12 pages.

Office Action on U.S. Appl. No. 10/816,497, mail date Jun. 4, 2007, 12 pages.

Office Action on U.S. Appl. No. 10/816,563, mail date Mar. 28, 2008, 20 pages.

Office Action on U.S. Appl. No. 10/816,563, mail date May 17, 2007, 10 pages.
Office Action on U.S. Appl. No. 10/816,563, mail date Nov. 1, 2007, 18 pages.
Office Action on U.S. Appl. No. 10/816,496, mail date May 27, 2009, 13 pages.
Office Action on U.S. Appl. No. 10/816,496, mail date Nov. 14, 2008, 9 pages.
Office Action on U.S. Appl. No. 10/816,496, mail date Nov. 24, 2009, 11 pages.
Office Action on U.S. Appl. No. 10/816,563, mail date Jan. 14, 2009, 18 pages.
Office Action on U.S. Appl. No. 10/816,563, mail date Jul. 23, 2009, 19 pages.
Petersen, C., "An Experimental Project Approach to Biology," Journal of College Science Teaching, Nov. 2000, vol. 30, No. 3, pp. 162-165.
Presentation by Fitch Ratings entitled "RMBS Credit Enhancement Model Development and Application" presented on Nov. 6, 2003, 97 pages.
Scowcroft, J.A. et al., "Managing Interest Rate Risk is Difficult, But Oh So Necessary", Bottomline, Feb. 1990, 3 pages.
Susan Wharton Gates et al, "Automated Underwriting: Friend or Foe to Low-Mod Households and Neighborhoods?", Nov. 2003, Building Assets, Building Credit: A Symposium on Improving Financial Services in Low-Income Communities, 25 pages.
Wayne Passmore et al, "The Effect of Automated Underwriting on the Profitability of Mortgage Securitization1", May 6, 1997, Federal Reserve Board, 27 pages.
Zorn et al, "Automated Underwriting and Lending Outcomes: The Effect of Improved Mortgage Risk Assessment on Under-Served Populations", Aug. 2001, Institute of Business and Economic Research, 22 pages.

* cited by examiner

METHOD AND SYSTEM FOR ASSESSING LOAN CREDIT RISK AND PERFORMANCE

CROSS-REFERENCE TO RELATED APPLICATIONS

This application is a continuation of U.S. Ser. No. 10/816,496, filed Apr. 1, 2004, entitled "Method and System for Assessing Loan Credit Risk and Performance", now U.S. Pat. No. 7,881,994, which claims the benefit of U.S. Provisional Application No. 60/502,131, filed Sep. 11, 2003 and entitled "Method and System for Determining the Probability of Delinquency of a Loan," and U.S. Provisional Application No. 60/516,822, filed Nov. 3, 2003 and entitled "Method and System for Comparing Loan Performance," both of which are hereby incorporated by reference.

FIELD OF THE INVENTION

The present invention relates generally to systems and methods used to assess credit risk and performance pertaining to financial assets, such as loans, securities, and so forth. More particularly, the present invention relates to a method and system for determining the probability of an event in connection with a mortgage loan (e.g., delinquency, default, prepayment, etc.). Further, the present invention relates to a statistical method and system for assessing the performance of a particular group of loans with respect to the performance of another comparable group of loans.

BACKGROUND OF THE INVENTION

The ability to assess risk is important in the context of financial lending. A defaulted loan or a delinquent loan is costly to the owner of the asset (initially the lender). As a lender improves its ability to determine risk associated with a loan, it can make better underwriting and pricing decisions that will result in fewer loans that default or become delinquent. In the secondary mortgage market, where mortgage loans are commonly sold to investors, fewer defaulted/delinquent loans results in a better return on investment, resulting in increased capital flow to the housing market. Even for loans that have already been made to a borrower, better risk predictions allow more effective risk management strategies to be employed (e.g., more effective hedging or workout strategies) and, therefore, decrease vulnerability to defaults/delinquencies. Better risk predictions, therefore, decrease the defaults/delinquencies, improve capital flow to the housing market, and ultimately decrease mortgage costs for consumers.

In the past, lending institutions, such as banks, have assessed loan risk using credit reports and/or credit scores. Credit reports are records sent from a credit reporting agency to prospective lenders, employers, and insurers that provide information about the credit standing of a consumer. Credit reporting agencies are companies that gather the information about consumers and sell it to creditors and/or employers and/or insurers. A credit score often refers to a number generated by a statistical model that is used to objectively evaluate the credit worthiness of the borrower(s) relevant to making a credit decision.

A large number of factors may be used to assess risk associated with a loan, including borrower-specific risk factors, loan-specific risk factors, and property/collateral-specific risk factors. Borrower-specific risk factors may include factors such as the borrower's credit score as mentioned above, as well as other factors such as the borrower's income and financial reserves. Property-specific risk factors may include factors such as whether the property is owner-occupied. Loan-specific risk factors may include factors such as the loan-to-value ratio, the loan amount, the loan purpose, and so on.

Loans are commonly sold in the secondary mortgage market shortly after the loan is made to the borrower (e.g., within a few months). Sometimes, loans are sold years later, usually as part of the sale of a group of loans. Determining risk of delinquency or default in this situation can be problematic, though, because data about the borrower may not be available. For example, for mortgage loans originated prior to late 1996, it was common for lenders to not obtain credit scores (e.g., FICO scores) for borrowers. As such, loan data sets for loans originated prior to late 1996 are often missing credit score data. As previously indicated, credit scores are an important predictor of delinquency/default. While it would be possible to supplement the loan data set with the borrower's current credit score, borrower consent is typically required to obtain such information, making this approach impractical. Likewise, other types of information, such as reserves (assets at origination relative to the monthly mortgage payment) and backend ratio (monthly debt payment relative to monthly income) are often also missing. So, while certain historical information may be correlated with default behavior, if the values are missing, it is difficult to determine the underlying risk of default for the loan.

Thus, there is a need for an improved method and system that provides a measure of loan credit risk and performance (e.g., the probability of delinquency or default of a loan). Further, there is a need to provide a comprehensive summary of many risk factors observed at loan acquisition combining the risk characteristics of borrower, property, loan, and other factors. Even further, there is a need to provide the above information in situations where information about some of the key variables is missing in the historical data.

Furthermore, in making risk assessments or conducting other loan performance analysis, a lending institution or other organization may choose to evaluate the performance of a particular group of loans relative to the performance of another group of loans. For example, the lending institution may desire to evaluate the performance of a newly created loan product and/or loans that are still in the early stages of repayment (e.g., loans that are still in the first or second year of repayment). The particular group of loans to be evaluated might include, e.g., loans from a particular lender, loans serviced by a particular loan servicer, or loans with the same or similar product characteristics. Because only a minimal amount of payment history has been compiled, it is often desirable for the lending institution to characterize the performance of this particular group of loans relative to the performance of a comparable group of loans with known payment history. The results of the comparison may then be used, for example, to assess and manage risk associated with the particular group of loans, or to make proper adjustment in the underwriting and pricing policies.

However, in making such a performance comparison, it is important to establish an appropriate benchmark to which a meaningful comparison can be made. For example, it may not be appropriate to compare the performance of a grouping of new loans from a particular lender who deals primarily with high-risk loans with the overall performance of an entire loan portfolio where that portfolio contains loans from a variety of lenders who may or may not deal in high risk loans. It is desirable to ensure that a meaningful comparison is made between the particular group of loans to be evaluated and the comparable group of loans. Additionally, it is also desirable to evaluate the statistical significance of any discrepancy in performance between the particular grouping of loans being evaluated and the comparable grouping of loans.

Further, in the context of financial lending, it is often desirable to have access to a means for making a meaningful comparison between different groups of loans and evaluating the statistical significance of any resulting discrepancies in loan performance that is easy to use and does not require an advanced knowledge of statistical theory. There is also need for an improved method and system for assessing the performance of a particular group of loans with respect to the performance of another comparable group of loans which provides a test statistic that is easy to characterize.

In addition, methodologies employed in making the loan performance comparison may sometimes provide inaccurate results if the loans in the particular group of loans to be evaluated are also included in the comparable group of loans. For example, a lending institution may desire to evaluate the performance of a grouping of a specific type of loan consisting of only those loans of that specific type that are still in the early stages of repayment (e.g., loans that are still in the first or second year of repayment) relative to a comparable group of loans comprising all loans of that specific type. Where very few of the loans in the comparable group have known payment history beyond the first or second year, the comparative analysis essentially operates to compare the performance of the particular group being evaluated with itself. Thus, there is need for an improved method and system for assessing the performance of a particular group of loans with respect to the performance of another comparable group of loans which makes it possible to avoid inaccuracies created when the study group is too dominant of a factor in the control group. In addition, there is further need for an improved method and system for assessing the performance of a particular study group of loans with respect to the performance of another comparable group of loans, wherein the comparable group of loans may either include or exclude the loans in the study group.

SUMMARY OF THE INVENTION

According to a first exemplary embodiment, a method for evaluating the performance of a study group of loans relative to the performance of a control group of loans includes determining a study group from a portfolio of individual loans; each of the individual loans in the portfolio having a performance variable associated therewith and a corresponding loan-specific value thereof; determining a control group from the portfolio of individual loans; determining a set of control variables associated with each of the individual loans included in the study group and the control group; partitioning the control group into one or more cells based on the set of control variables; calculating an estimated performance value for each of the individual loans in the study group based on the cells; and calculating a performance difference for the study group.

According to a second exemplary embodiment, a method for evaluating the performance of a study group of loans relative to the performance of a control group of loans includes determining a study group, the study group comprising a first grouping of loans having a common grouping characteristic and being selected from a portfolio of individual loans, each of the individual loans in the portfolio having a performance variable associated therewith and a corresponding loan-specific value thereof, and one or more control variables associated therewith and corresponding loan-specific values thereof; determining a control group, the control group comprising a second grouping of loans selected from the portfolio of individual loans; determining a set of control variables, the set of control variables comprising one or more of the one or more control variables associated with each of the individual loans included in the study group; partitioning the control group into one or more cells, each cell comprising the individual loans in the control group having the same or similar loan-specific control variable values for each of the control variables included in the set of control variables; calculating an estimated performance value for each of the individual loans in the study group based on the cells; and calculating a performance difference for the study group, the performance difference comprising the difference between the average over the study group of the loan-specific performance variable value for each individual loan in the study group and the average over the study group of the estimated performance value for each individual loan in the study group.

According to a third exemplary embodiment, a system is configured to evaluate the performance of a study group of loans relative to the performance of a control group of loans. The system includes a memory including loan variable data for a portfolio of individual loans; and a processor coupled to the memory and operable to execute programmed instructions. The programmed instructions (a) determine a study group from the portfolio of individual loans; (b) determine a control group from the portfolio of individual loans; (c) determine a set of control variables associated with each of the individual loans included in the study group and the control group; (d) partition the portfolio of individual loans into one or more relevant cells based on the set of control variables; (e) calculate an estimated performance value for each of the individual loans in the study group based on the cells; and (f) calculate a performance difference for the study group.

According to a fourth exemplary embodiment, a method for evaluating the performance of a study group of loans relative to the performance of a control group of loans includes determining a study group from a portfolio of individual loans; each of the individual loans in the portfolio having a performance variable associated therewith and a corresponding loan-specific value thereof; determining a control group from the portfolio of individual loans; the control group being exclusive of the study group; determining a set of control variables associated with each of the individual loans included in the study group and the control group; partitioning the control group into one or more cells based on the set of control variables; calculating an estimated performance value for each of the individual loans in the study group based on the cells; and calculating a performance difference for the study group.

According to a fifth exemplary embodiment, a method for evaluating the performance of a study group of loans relative to the performance of a control group of loans includes determining a study group from a portfolio of individual loans; each of the individual loans in the portfolio having a performance variable associated therewith and a corresponding loan-specific value thereof; determining a control group from the portfolio of individual loans; the control group being inclusive of the study group; determining a set of control variables associated with each of the individual loans included in the study group and the control group; partitioning the control group into one or more cells based on the set of control variables; calculating an estimated performance value for each of the individual loans in the study group based on the cells; and calculating a performance difference for the study group.

Other features and advantages of the present invention will become apparent to those skilled in the art from the following detailed description and accompanying drawings. It should be understood, however, that the detailed description and specific examples, while indicating exemplary embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings.

DETAILED DESCRIPTION OF THE PREFERRED EMBODIMENTS

I. Loan Performance Analysis

Figure 1:
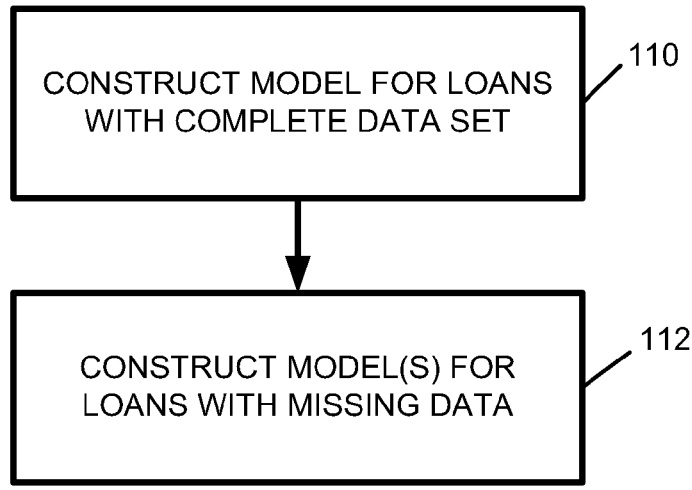
FIG. 1 is a process for constructing an ACI model useable to calculate the credit index for different loans in accordance with an exemplary embodiment.
Figure 2:
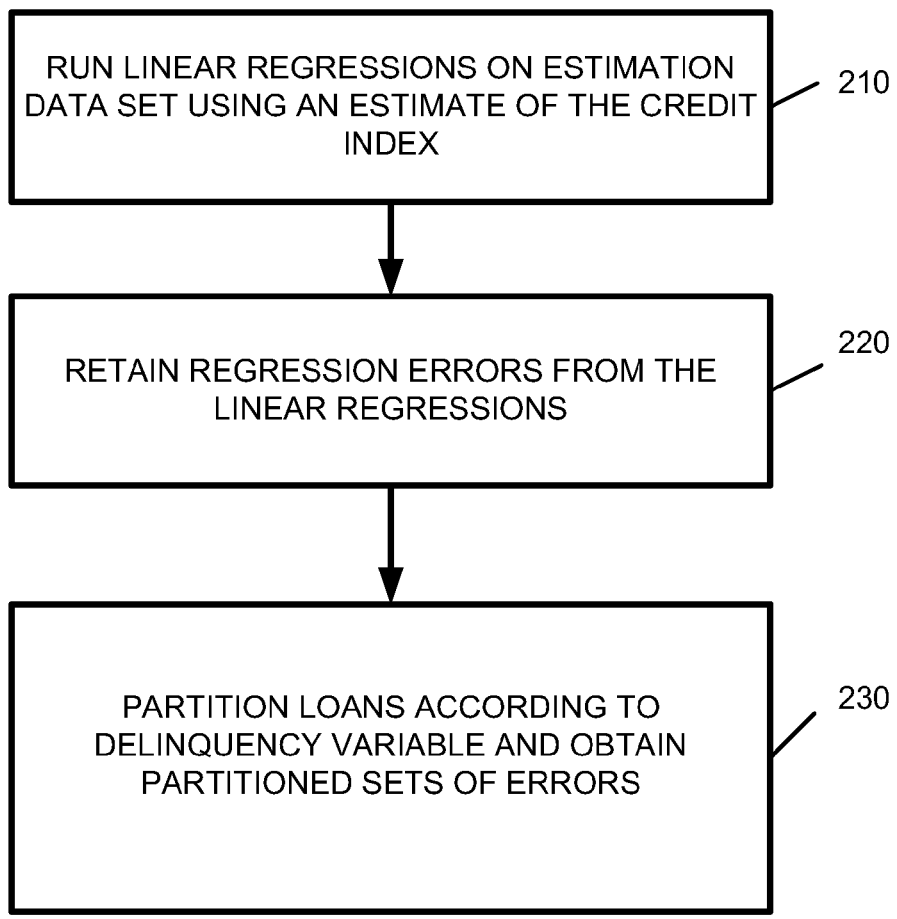
FIG. 2 is a flow diagram depicting construction of missing variables models in accordance with an exemplary embodiment.
Figure 3:
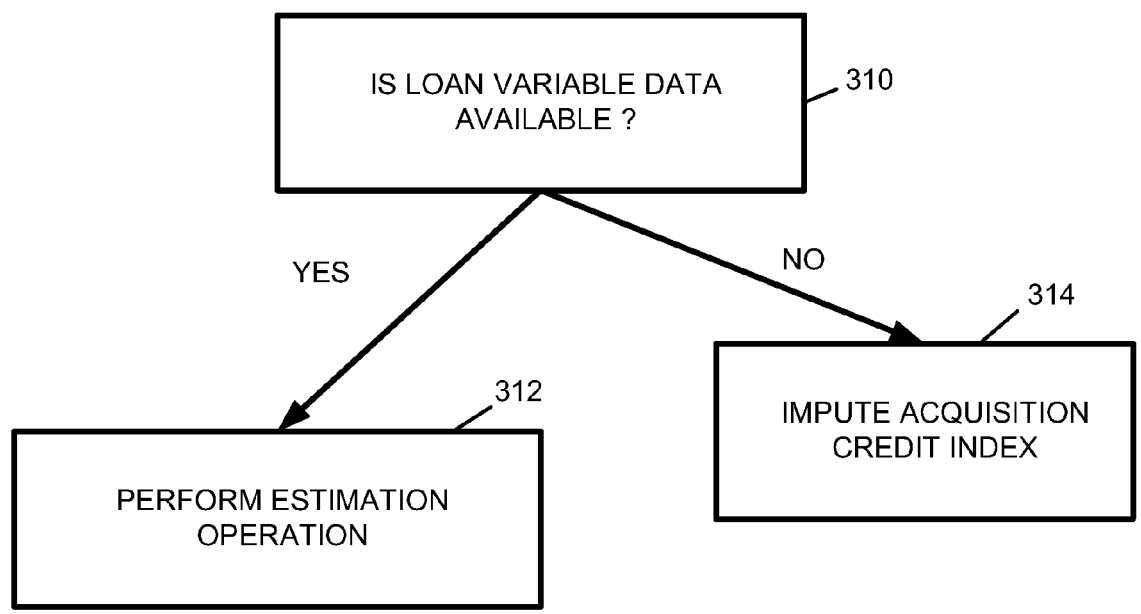
FIG. 3 is a flow diagram depicting an imputation operation in accordance with an exemplary embodiment.

Turning now to FIGS. 1-3 which illustrate exemplary embodiments with general regard to loan performance analysis, a system and method are shown which provide a comprehensive measure of many risk factors observed at loan acquisition including risk characteristics of borrower, property, loan, and other factors. In one embodiment, the comprehensive measure, referred to herein as an acquisition credit index (ACI), represents the probability of an adverse outcome (e.g., delinquency, default) within a predetermined period of time after loan acquisition. The credit index summarizes risk characteristics pertaining to the loan, its collateral, as well as the borrower(s). In the illustrated embodiment, an ACI model is created using a common logistic regression technique to link a dependent variable (the credit index) and a set of explanatory variables (variables relating to risk characteristics). Further, related ancillary models are created that may be used in connection with loans in which some of the explanatory variables are missing, non randomly, for some time period or for some subset of the loans. The related models allow the assessment of ACI for loans with missing risk characteristics. This allows the credit index to be determined not only for loans having no missing variables but also for loans in which at least some of the variables are missing. Additional, fewer, or different operations may be performed.

Referring now to FIG. 1, a process for constructing an ACI model useable to calculate the credit index for different loans is shown. The ACI model comprises a series of models usable in different scenarios, depending on whether a particular loan has any missing variables and, if so, which variables are missing. Accordingly, at step 110, a first primary model is constructed for loans with no missing variables. At step 112, one or more additional ancillary models are constructed for loans with one or more missing variables. The different ACI models allow the risk characteristics of different loans to be compared, even though different amounts/types of data are available for the different loans.

The models may be based on any of a wide variety of statistical models, and the explanatory variables may be any of a wide variety of loan variables. Also, different numbers of variables may be used. Preferably, the model types, loan variable types, and number of loan variables are chosen so as to enhance the predictive value of the ACI values produced.

Examples of different types of models that may be used include log-linear, logit and probit models. In the preferred embodiment, described herein, a logit model is used that links the set of explanatory variables with the probability of an adverse event. The logit model that has the following form:

$$ACI_n = \frac{e^{X_n \beta}}{1 + e^{X_n \beta}} \qquad \text{Eq. (1)}$$

In Equation (1), X represents the explanatory loan variables (e.g., data acquired from the borrower at loan origination), β represents parameters or weighting coefficients of the model, the subscript m specifies a particular loan, and ACI is the acquisition credit index. For example, if there are K loan variables (X) and N number of loans, then there are K×N different values of X for the N loans:

$$X_{1,1} \ldots X_{K,1}$$
$$\ldots \ldots$$
$$X_{1,N} \ldots X_{K,N}$$

The K loan variables (X) associated with a particular loan n represent a vector of control variables $X_n$ of the form:

$$X_{1,n} \ldots X_{K,n}.$$

Similarly, β in Eq. (1) represents the model parameters or weighting factors $\beta_1$ through $\beta_K$ for all of the loan variables X, $X_1$ through $X_K$, in this example. Equation (1) may therefore be rewritten in longer form as follows:

$$ACI_n = \frac{e^{(X_{1,n}\beta_1 + X_{2,n}\beta_2 + \ldots + X_{K,n}\beta_K)}}{1 + e^{(X_{1,n}\beta_1 + X_{2,n}\beta_2 + \ldots + X_{K,n}\beta_K)}}. \qquad \text{Eq. (2)}$$

It will be appreciated that variable definitions and equations used herein are merely exemplary and other specifications may be used. The model is preferably constructed such that ACI represents the probability of an adverse outcome (e.g., delinquency, default, prepayment) for a particular loan within a predetermined period of time (e.g., 60 days, 90 days, etc.) after acquisition of the loan.

For each model, constructing the model includes (1) determining how many loan variables to use, (2) determining which loan variables to use, and (3) determining the best set of weighting coefficients for the model. Typically, loan variables may be categorized into a number of different groups, and it may be desirable to use loan variables from different groups. For example, loan variables may be categorized into two groups depending on whether data for the loan variables is subject to being missing (i.e., a first group of loan variables for which data is generally available, and a second group of loan variables for which data may be available but is sometimes missing). As previously indicated, it may be desirable to use loan variables for which data is sometimes missing (for those specific loans in which the data is not missing) in addition to loan variables for which data is generally available in order to enhance the predictive power of the respective model. The loan variables may also be categorized according to the manner in which the loan variable provides a measure of risk. For example, some loan variables may be borrower-related (e.g., credit score), other loan variables may be property related (e.g., number of units), other loan variables may be transaction-related (e.g., loan purpose), and so on. It will be appreciated that the groups need not be mutually exclusive.

In an exemplary embodiment, fourteen loan variables X are used in the estimation of ACI. An example of fourteen variables X that may be used include the following: credit score, the origination LTV (loan-to-value), the number of credit scores, the backend ratio, type of loan originator, number of housing units, loan type, the relative loan size, months of reserves, loan purpose, occupancy status, documentation level, whether loan is for a manufactured home, and a residual credit risk indicator. Numeric or categorical values for each of these variable may be assigned and used in Eq. (1). As indicated above, other numbers and types of loan variables may also be used. Preferably, loan variables are chosen which exhibit correlation with the likelihood of the adverse consequence (e.g., of a delinquency or default).

The exemplary fourteen loan variables will now be described in greater detail. Generally, a credit rating or score is considered an early delinquency or default predictor because it is itself an index of other variables. When there are two borrowers for a loan, there are often two credit scores, one for the borrower and the other for the co-borrower. In some instances, however, there may be only one credit score which, if there are two borrowers, means that the data set is incomplete. An example of a credit score is the Fair Isaac (FICO) credit score. Herein, it is assumed that FICO scores are used. There are several different ways to use the two scores, including mean credit score and minimum credit score.

Backend information relates to the ratio of debt to monthly income (the percentage of a borrower's paycheck that goes to pay monthly debts). Backend information can be helpful in a determination of risk for delinquency or default because it shows how much of a borrower's monthly paycheck goes towards paying the loan. Where a higher percentage of the paycheck is used for loan payment, the greater the chance is that the payment may be skipped.

Reserve information relates to money held in reserve to make payment on the loan. Similar to backend information, reserve information can be helpful to determining the likelihood of delinquency or default because the more money that a borrower has in reserve (e.g., in a savings or checking account), the less likely the loan will not be paid.

The origination loan-to-value (OLTV) variable describes the percentage of the amount borrowed relative to the amount at which the purchased property is valued. High OLTV scores indicate a greater risk. For example, where the OLTV is greater than 80%, personal mortgage insurance (PMI) is generally required because of the increased risk of default or delinquency.

The number of credit scores variable indicates the number of credit scores which are available (e.g., for different borrowers on the loan). The loan variable for number of credit scores can be simply an indication for one, two, or more credit scores present.

The type of originator variable indicates the type of originator that originated the loan (e.g., broker, lender, and so on), and may also be used to designate particular originators. Certain brokers, correspondents, etc. may correlate with certain borrower performance. That is, loans from particular brokers may be more or less likely to go into serious delinquency or default. The type of originator loan variable may be assigned a logistical value which is uniquely assigned to the particular originator.

The number of units variable indicates the number of units in the housing that collateralizes the loan. The number of units in a loan for multi-unit properties can be indicative of borrower performance. All such information can be helpful in assessing the risk and reducing the overall cost of the loan for the borrower.

The product type variable indicates the type of loan product obtained by the borrower. For example, loans can be less than one year adjustable rate mortgages (ARM), fifteen year fixed rate mortgages, twenty to twenty-five year fixed rate mortgages, thirty year balloon mortgages, and others. Different loans may have different risk attributes. That is, different loans may be more or less likely to be taken out by someone who will be delinquent or default on payment soon after taking the loan out. One example of a type of loan that affects a credit risk is a so-called "cash out" loan. A cash out loan refers to a loan where money is taken out of the equity of, for example, a home in exchange for cash at closing. Such loans are indicative of a borrower that does not have much cash in reserve and, thus, is more likely to be delinquent or default on the loan. Again, the type of loan product variable may be assigned a logistical value which is uniquely assigned to the particular type of loan product.

The loan size variable indicates the size of the loan (e.g., in dollars). A small loan amount may serve as a proxy for unstable borrower income or weakness in home prices. Loan size may be determined based on loan amount and possibly one or more factors, such as origination state, property type, or originating quarter. Any definition can be used for loan size. Different loan size definitions may be more or less advantageous in different situations.

The documentation level variable indicates the document level of the loan. Loans with a low level of documentation ("low doc loans") have missing or poorly measured backend ratios (the ratio of available money to pay the loan and amount of the loan payment). As such, these loans may be excluded from the group of loans that are used to construct the models in order to generate the ACI model based on a set of loans with non-missing data. It is well known that low doc loans bear additional risk. It is also true that these loans are charged higher rates in order to compensate for the increased risk. This additional rate may show up as residual credit risk, described below. As the effect of residual credit risk is different from the risk of a low doc loan, consistency may be maintained in the model by scoring low doc loans with zero credit residual credit risk and calculating measures of the additional risk of low doc loans by considering the 12-month performance rates of low doc loans.

The manufactured housing variable indicates whether the loan is collateralized by manufactured housing. There may be a correlation between a borrower being more or less likely to become seriously delinquent or default if the loan is for a manufactured house.

Finally, the residual credit risk variable may be a value that is configured to capture other risk not already captured in the above loan variables. For example, the residual credit risk variable may be configured to reflect the difference between the note rate of the loan and the average note rate of similar loans within the same origination cohort. A note rate premium may be a predictor of delinquency to the extent that a higher note premium reflects higher risk of delinquency. The credit premium may be used to capture risk factors that are observable to the lender and that enable the lender to obtain a higher note rate. If credit premium is used, it may be desirable to adjust the residual credit risk indicator in accordance with points, origination fees, other costs that a borrower may pay to buy down the note rate, lender paid mortgage insurance, and other factors, and to account for the fact that other variables in the ACI estimate may also involve the note rate. Alternatively, it may be desirable to base the residual credit risk indicator on other parameters, or to not use a residual credit risk indicator.

If the note rate includes lender-paid mortgage insurance (LPMI), to adjust for such measurement error, the note rate may be adjusted using the definition: NoteRate=Raw NoteRate−LPMI, if LPMI is present. Other adjustments can be made for points, origination fees, and other costs paid to buy down the note rate.

Also, as noted, other variables used in the ACI estimate also involve the note rate. To account for this fact, the note rate on other variables in ACI estimation are regressed or moved to the statistical mean with the 30 year fixed rate refinance rate at origination. The loan-level credit premium can be calculated as the difference between Note Rate and Predicted Note Rate: Credit Premium=Note Rate−Predicted Note Rate. The predicted note rate may be calculated by starting with a "baseline" note rate that may be expected to be offered for a typical borrower/loan, and then adjusting the note rate up or down in accordance with deal-specific variables associated with a particular loan (e.g., loan to value, FICO scores, backend ratio, type of originator, loan purpose occupancy, number of units, loan amount (including whether the loan amount is under the conforming limit), reserves, number of borrowers, product (e.g., ARM, FRM15, FRM20, FRM25, FRM30), refinance rate * product, and whether the loan is for manufactured housing). This new credit premium can be used in Eq. (1) above. For example, if the baseline note rate assumes a loan to value at closing of more than 95%, the predicted note rate may be adjusted downwardly to the extent that the loan to value ratio for a loan under consideration is less than 95%. This process may then be repeated for each of the parameters used to generate the predicted note rate. It may also be desirable to censor the credit premium on the [0.0%, 2.0%] interval. This may prevent credit premium variable from dominating in the ACI and producing unrealistic probabilities of risk in some loans.

Additional loan variables may also be used in the ACI model. Such data can increase the explanatory power of ACI. For example, the loan variables may also include reserve capacity. Reserve capacity refers to the difference between the borrower's gross monthly income and the borrower's monthly debt obligations, with the difference being further divided by a deflation constant which reflects the origination year median area income level defined by HUD for the MSA, county, or state of origination. Monthly debt obligations include housing payment, other installments, revolving debts, and minimum monthly credit card payments. If the subject property is not in an MSA, or the MSA income is missing, then a deflation constant for the county of origination may be used. If the county is also missing then a deflation constant for the state of origination may be used. The purpose of dividing by the deflation constant is to take regional or MSA level differences out of the variable and resulting ACI score. Based on the this calculation, the reserve capacity may be assigned to one of a number of categories (e.g., 0<reserve capacity≦$1000; $1000<reserve capacity≦$1500; $1500<reserve capacity≦$2000; $2000<reserve capacity≦$3000; $3000<reserve capacity≦$4000; $4000<reserve capacity≦$5000; $5000<reserve capacity≦$9999). A numeric score may then be assigned to the reserve capacity as a function of the category into which the reserve capacity is placed based on the above calculations.

Once the number of loan variables is selected and the loan variables are determined, statistical procedures are used to determine the optimal values for the weighting coefficients, i.e., model parameters. Different estimation techniques may be used to select the optimal weighting coefficients, as known to those skilled in the art, depending on the regression model used. For example, simple linear regressions involve one dependent variable and one independent variable. Multiple linear regressions involve one continuous dependent variable and more than one independent variables. Logistic regression is used to model the relationship between a categorical variable/discrete outcome (e.g., binary response variable) and one or more predictor variables, which may be either discrete or continuous. The type of regression technique chosen may depend on the type of model used, number/types of input variables to the model and/or the output variable that is desired to be produced. In the embodiment described herein, a logistic regression is used.

The ACI model is constructed using a loan data set (or "estimation data set") comprising loans (1) for which no loan variables are missing, and (2) for which performance history is available. The same set of loans is used to construct the model in step 110 and the models in step 112. First, to construct the model as set forth in step 110, a coefficients $\beta$ is selected which minimizes the generalized error (e.g., mean squared error) in the model in predicting the delinquency of the loans in the loan data set. Regression estimation techniques are used, such as maximum likelihood. Thus, an initial set of $\beta$ coefficients is first computed, and then additional sets of $\beta$ coefficients are iteratively computed until a set of $\beta$ coefficients is arrived upon that is considered to be the most optimal set of $\beta$ coefficients. This is readily available as a canned procedure in many statistical program languages and commercial software packages, such as PROC LOGISIC in SAS®.

As previously mentioned, for loans that are older, information on certain variables is likely to be unavailable, such as reserves, credit scores, and backend ratio. Accordingly, it is desirable to estimate ACI for loans with missing data as well. The approach in the exemplary embodiment is to construct additional ancillary models (step 112) for the loans with missing data. Preferably, the additional models have the same general form as the model set forth in Eq (1), except that fewer independent variables are used.

FIG. 2 illustrates a process for constructing such ancillary models. According to the process, loans not missing loan variable data (the same group of loans used in step 110) are used to construct the models in step 112 intended for the loans missing the loan variable data.

As previously indicated, older loans may be missing loan variable data, whereas newer loans are not. Accordingly, for convenience, the term "pre-estimation data set" is used to refer to loans where loan variable data is not complete and the term "estimation data set" is used to refer to loans where loan variable data is complete. Depending on how the techniques described herein are used, for example if the techniques are used for other applications, loans in these different data sets may or may not be older or newer than each other. The estimation data set may comprise all loans for which complete data is available. Alternatively, the estimation data set may comprise a group of loans selected on the basis that they have characteristics similar to the loan or group of loans under consideration.

In an exemplary embodiment, linear regressions are performed on loan data from the estimation data set in connection with additional models configured for loans in the pre-estimation data set. Although the loan variable data is available for loans in the estimation data set, to estimate the credit index for loans in the pre-estimation data set, loan variables in the estimation data set that are generally missing from loans in the pre-estimation data set are removed from the estimation data set. For example, if it is assumed that three of the fourteen loan variables (e.g., reserves, credit score/FICO, and backend) are liable to missing in the pre-estimation data set, then combinations of these three variables are artificially removed from the estimation data set so that an estimate can be provided of coefficients or model parameters of the remaining eleven loan variables with the coefficients for the "missing" loan variables removed. As will be seen in Eqs. (3)-(6), below, the dependent variable in these ancillary models is based on the predicted value, $X\beta$, from the primary model, instead of the observed value of the loan performance. The model parameters can then be used in the imputing of an ACI for loans that are missing these variables.

In an operation 210, linear regressions are performed on an estimation data set to determine weighting coefficients for the various additional models. For purposes of the estimation of the coefficients for the models configured for pre-estimation data set loans, in a first case, the linear regressions are performed on X' loan variables with reserves, backend, and FICO removed. Therefore, X' includes eleven loan variables for purposes of the linear regression instead of fourteen. Mathematically, the regression uses the following relationship:

$$X\beta = X'\beta_L + E_1. \qquad \text{Eq. (3).}$$

where X represents, for example, 14 loan variables as described above in connection with Eqs. (1)-(2); X' represents a subset of the 14 loan variables (e.g., the 14 loan variables with reserves, backend, and FICO removed); $\beta$ represents the model parameters for the complete variable model (e.g., the fourteen variable model described above in connection with Eqs. (1)-(2)); $\beta_L$ represents the model parameters where the parameters for reserves, FICO and backend are missing; and $E_1$ represents error.

From Eq (1), it is seen that if $X\beta$ is known, then ACI is known. Accordingly, it is desirable to select the weighting coefficients $\beta_L$ so as to minimize the difference between $X\beta$ and $X'\beta_L$ for the group of loans in the estimation data set. This results in a model which produces credit index values which closely approximate the credit index values produced by the complete-variable model of Eq. (1). After the optimal weighting coefficients $\beta_L$ are determined, the $E_1$ error values are then stored for later use (step 220) in ensuring that the imputed ACI preserves the same distribution as the "observed" ACI calculated using Eq. (1).

Specifically, the regression is used to determine an estimate for the model parameters for $\beta_L$. The estimate is designated symbolically using a hat symbol, ^. Therefore, the estimate for $\beta_L$ is $\hat{\beta}_L$. The estimated model parameters are used in error calculations in operation 220.

Here, the equation $X\beta = X'\beta_L + E_1$ has coefficients $\beta_L$. The coefficients $\beta_L$ are iteratively estimated so as to minimize the error (e.g., squared error) in the missing-variable ACI model (that is, relative to the ACI values computed using the complete-variable model of Eq. (1)). Thus, Eq. (3) is applied to all loans in the estimation data set using an initial set of $\beta_L$ coefficients. A new set of $\beta_L$ coefficients is selected and Eq. (3) is again applied to all loans in the estimation data set. This process is iteratively repeated until a set of $\beta_L$ coefficients (designated herein as $\hat{\beta}$) is reached that minimizes overall error (e.g., squared error) between $X\beta$ and $X'\beta_L$ for the complete set of loans in the estimation data set. For example, a sum of squares minimization approach may be used (that is, minimizing $\Sigma_{i=1}^{M} E_1(L_i^2)$ where $L_i$ is a particular loan in a set of loans indexed by i={1, 2, ..., N}). Once the optimal set of coefficients $\hat{\beta}_L$ is determined, the error value $E_1$ that is produced for each loan using the coefficients $\hat{\beta}_L$ is stored (step 220) for later use as described below in connection with Table 1.

In similar fashion, loan variables X from the estimation data set can be used along with available backend data to estimate missing model parameters in an equation that accounts for the added available backend data. Mathematically, where reserves and credit scores are missing, the following relationship is used to construct a model:

$$X\beta = X'\beta_{LB} + \delta_{LB}\text{Backend} + E_2 \qquad \text{Eq. (4).}$$

where X' represents a subset of the 14 loan variables (e.g., the 14 loan variables with reserves, backend, and FICO removed), $\beta_{LB}$ represents the model parameters where the parameters for reserves, FICO and backend are missing; and $E_1$ represents error, Backend is known (defined the same as in X), and $\delta_{LB}$ the weighting coefficient for Backend. (Here, X' is defined as in Eq. (3). Of course, by redefining X', Eq. (4) could also be rewritten such that the Backend term is included in X' and such that $\delta_{LB}$ is included in $\beta_{LB}$.) The linear regression is used to estimate the best (squared error minimizing) set of coefficients $\beta_{LB}$ and $\delta_{LB}$, designated ($\hat{\beta}_{LB}$, $\hat{\delta}_{LB}$). Once the optimal set of coefficients ($\hat{\beta}_{LB}$, $\hat{\delta}_{LB}$) is determined, the error value $E_2$ that is produced for each loan using the coefficients ($\hat{\beta}_{LB}$, $\hat{\delta}_{LB}$) is stored (step 220) for later use as described below in connection with Table 1.

In the situation where reserves and backend data are missing and credit scores are available, loan variables X' and ACI are used with the available credit scores (e.g., FICO) to provide an estimate of the missing data. Mathematically, the following relationship is used to construct a model:

$$X\beta = X'\beta_{LF} + \gamma_{LF}\text{FICO} + E_3. \qquad \text{Eq. (5).}$$

where ACI from the estimation data set is known, X' is known, and FICO is known. The linear regression is used to estimate the best (squared error minimizing) set of coefficients $\beta_{LF}$ and $\gamma_{LF}$, designated ($\hat{\beta}_{LF}$, $\hat{\delta}_{LF}$), and then error values $E_3$ are stored (step 220). In like fashion, where reserve data is all that is missing, X', ACI, known backend, and known FICO can be used to estimate the missing reserves. Mathematically, the following relationship is used to construct a model:

$$X\beta = X'\beta_{LFB} + \delta_{LFB}\text{Backend} + \gamma_{LFB}\text{FICO} + E_4. \qquad \text{Eq. (6).}$$

where $\delta_{LFB}$ is a model parameter where Backend is known and $\gamma_{LFB}$ is a model parameter where FICO is known. The linear regression is used to estimate the best (squared error minimizing) set of coefficients $\beta_{LF}$, $\delta_{LFB}$, and $\gamma_{LF}$, designated ($\hat{\beta}_{LFB}$, $\hat{\delta}_{LFB}$, $\hat{\gamma}_{LFB}$), and then error values are stored (step 220).

Eqs(7)-(10) show the equations used to calculate the regression errors ($E_1$, $E_2$, $E_3$, and $E_4$) described above in connection with Eqs. (3)-(6):

$$E_1 = X\beta - X'\hat{\beta}_L, \qquad \text{Eq. (7)}$$

$$E_2 = X\beta - (X'\hat{\beta}_{LB} + \hat{\delta}_{LB}\text{Backend}), \qquad \text{Eq. (8)}$$

$$E_3 = X\beta - (X'\hat{\beta}'_{LF} + \hat{\delta}_{LF}\text{FICO}), \text{and} \qquad \text{Eq. (9)}$$

$$E_4 = X\beta - (X'\hat{\beta}_{LFB} + \hat{\delta}_{LFB}\text{Backend} + \hat{\lambda}_{LFB}\text{FICO}) \qquad \text{Eq. (10).}$$

In an operation 230, loans in the estimation data set are partitioned according to a delinquency variable. In an exemplary embodiment, the delinquency variable can be (A) never delinquent, (B) delinquent no more than 30 days in 12 months after acquisition, (C) delinquent between 30 and 90 days in 12 months after acquisition, and (D) delinquent 90 days or higher in 12 months after acquisition. The regression errors are sorted according to delinquency variables A, B, C, and D.

The partitioning of loans from the estimation data set is illustrated using Table 1 below. The partitioning results in four sets of errors for $E_1$, four sets of errors for $E_2$, four sets of errors for $E_3$, and four sets of errors for $E_4$. A total of sixteen error sets are formed.

TABLE 1

| Never Delinquent = A | Delinquent no more than 30 days = B | Delinquent between 30 and 90 days = C | Delinquent more than 90 days = D |
|---|---|---|---|
| $E_1$ from A loans | $E_1$ from B loans | $E_1$ from C loans | $E_1$ from D loans |
| $E_2$ from A loans | $E_2$ from B loans | $E_2$ from C loans | $E_2$ from D loans |
| $E_3$ from A loans | $E_3$ from B loans | $E_3$ from C loans | $E_3$ from D loans |
| $E_4$ from A loans | $E_4$ from B loans | $E_4$ from C loans | $E_4$ from D loans |

In Table 1, within each of the sixteen error cells shown, a group of errors are stored corresponding to the errors calculated above as described in connection with Eqs (7)-(10).

In order to impute ACI for loans that are missing data, depending on which loan variables are available, estimated model parameters or coefficients are obtained from Eq. (2)-(5) in operation 210 and a random draw is made from the set of errors generated in operation 230 corresponding to the loan's delinquency history. The random draw from the sets of errors provides an empirical error corresponding to the relative delinquency. For a large group of loans, the random draw from the sets of errors brings the ACI estimates produced by the missing-variable models into overall alignment with the complete-variable model of Eq. (1) by preserving the distribution of the imputed ACI relative to the ACI as calculated with the complete data set, although the ACI estimates will, of course, still experience errors on a loan-by-loan basis.

By way of mathematical examples, in the situation where the backend and FICO for a loan are missing, its imputed ACI is:

$$ACI_{LN}=X\hat{\beta}_L+\epsilon,\qquad\text{Eq. (11).}$$

where $\epsilon$ is a random draw from the set of $E_1$ errors that the loan belongs to according to its loan-specific delinquency (see Table 1). The "LN" subscript is represents the fact that the functional form of the equation used to calculate ACI in Eq. (11) is different than in Eq. (1) (and, specifically, does not include an exponential term) (For the ACI in Eq. (1), $ACI_{LN}=X\beta=(\log(ACI)-\log(1-ACI).)$ Accordingly, $ACI_{LN}$ in Eq. (11) is scaled differently than in Eq. (1). It will be appreciated that $ACI_{LN}$ may be put into a form comparable to the form of ACI using an exponential equation having the form of Eq. (1). It also will be appreciated that model outputs may be scaled and otherwise manipulated in a variety of ways, as desired.

As noted above, $\epsilon$ is a random draw from the set of $E_1$ errors that the loan belongs to according to its loan-specific delinquency (see Table 1). It may be noted that the credit index may be used to analyze performance of a group of loans for which performance data is available. Accordingly, in this embodiment, the random draws may occur based on knowledge of the performance of data.

For a loan whose credit score (e.g., FICO) is missing, its imputed ACI is:

$$ACI_{LN}=X\hat{\beta}_{LB}+\hat{\delta}_{LB}\text{Backend}+\epsilon,\qquad\text{Eq. (12).}$$

where $\epsilon$ is a random draw from the set of $E_2$ errors that the loan belongs to according to its loan-specific delinquency (see Table 1). For a loan with observed FICO, its imputed ACI is:

$$ACI_{LN}=X\hat{\beta}_{LF}+\hat{\delta}_{LF}\text{FICO}+\epsilon,\qquad\text{Eq. (13).}$$

where $\epsilon$ is a random draw from the set of $E_3$ errors that the loan belongs to its loan-specific delinquency (see Table 1). For a loan with observed backend and FICO, its imputed ACI is:

$$ACI_{LN}=X\hat{\beta}_{LFB}+\hat{\delta}_{LFB}\text{Backend}+\hat{\gamma}_{LFB}\text{FICO}+\epsilon,\qquad\text{Eq. (14).}$$

where $\epsilon$ is a random draw from the set of $E_4$ errors that the loan belongs to according to loan-specific delinquency variables generated from the estimation data set (see Table 1).

Referring now to FIG. 3, FIG. 3 shows how the models constructed in FIGS. 1-2 may be used to calculate ACI. In an operation 310, for a particular loan under consideration, a determination is made as to whether a complete set of loan variable data is available. If loan variable data is available, an operation 312 is performed to estimate the likelihood of a delinquency within a period of time as a function of the loan variable data. In an exemplary embodiment, this estimation operation can be for the loan-level probability of 90-day plus loan delinquency within the first two years as a function of loan level characteristics. The model set forth in Eq. (1) may be used to perform this calculation.

If loan variable data is not available, an operation 314 is performed to impute the acquisition credit index (ACI) from the data that is available. The ACI can be imputed by an imputation operation using one of the ancillary models discussed above in Eqs (3)-(6), depending on which loan variables are missing. Thus, the models discussed above in Eqs. (3)-(6) allow the missing explanatory variables to be imputed. This allows the credit index to be determined not only for loans having no missing variables but also for loans in which at least some of the variables are missing. For a large group of loans, the random draw from the sets of errors brings the ACI estimates produced by the missing-data models of Eqs (3)-(6) into overall alignment with the complete-data model of Eq. (1) by preserving the distribution of the imputed ACI relative to the ACI as calculated with the complete data set. For both the complete-data (primary) model and the missing-data (ancillary) models, a credit index value is produced which provides a comprehensive summary of many risk factors observed at loan acquisition combining the risk characteristics of borrower, property, loan, and other factors.

The ACI is a convenient and powerful tool for both the measurement of loan risk and the assessment of loan performance. ACI provides a superscore that accounts for many data dimensions. Additionally, the ancillary models provide the ability to determine ACI even for loans that are missing several important variables.

The ACI provides a convenient way for ranking loans with similar risk of serious delinquency. The ACI can provide a tool for comparing loans with similar characteristics (i.e., ACI scores) across groups such as brokers, sellers, servicers, or loan approval recommendations. Using ACI and additional normalizations, it is possible to evaluate the actual performance a variety of different loan sets. Examples of different loans sets include loans with expanded underwriting recommendations, A-minus loans, Alt-A loans, and loans of the top ten servicers and the top five lenders.

As has been indicated, the ACI model may be used to predict loan performance, such as delinquency or default. While ACI as a predictor of delinquency risk is highly correlated with default risk, the relative weighting of factors in the model may change over time. For example, the backend ratio or number of months of reserves has a larger impact on default probability than on 12-month delinquency. To account for this, the parameters on backend ratio and 0-1 month reserves can be increased when the ACI is applied to the conditional default model. The estimated coefficient on single borrowers is reduced to avoid over-predicting the risk captured by other factors.

The models may also be used to predict other loan performance parameters, such as prepayment. This may be done in the same manner as described above in connection with delinquency/default, except that the dependent variable is prepayment. Other parameters may also be taken into account, such as interest rate, home price, credit index, age, to predict prepayment risk or analyze prepayment performance.

The ACI model may be used as an input into other systems. The ACI model can be used in models for credit risk pricing, loss forecasting, loss severity, early warning portfolio analysis and credit metrics. The ACI model can also be used to avoid appraisal bias and to perform counterparty risk analysis.

For example, the credit index may be provided as an input into an automated underwriting in order to assess loan credit risk for a potential loan and/or as an input into a pricing engine in order to allow loan pricing to be determined in accordance with the loan credit risk. This allows feedback regarding actual loan performance to be provided to the automated underwriting and/or pricing engine, so that underwriting or pricing models may be modified. This also allows underwriting and/or pricing to be performed based on a credit index calculated using loan variables for the loan under consideration. Because historical performance data is not available in this situation, the random selection of errors is performed using a set of errors that is not partitioned according to a delinquency variable. This produces a less accurate though still useful result.

The ACI model may also be used for loss forecast and loss severity analysis. Loss severity analysis predicts dollar revenues and costs for defaulted loans in a pool of loans. Different losses may be calculated, such as actual loss, expected loss (average of all possible outcomes), and stress loss (for worst case scenario planning).

The ACI model may also be used for due diligence in connection with the purchase of new loans to be acquired, for example, to predict the performance of the loans before they are acquired.

The ACI model provides a method for standardizing the measure of credit risks between loans with different characteristics. The model captures multiple static variables observed at loan acquisition. Once each loan is scored, it is possible to group loans with similar scores together to compare performance along a variety of other dimensions (e.g., originator, product type, and so on). In addition, the credit index may also be combined with other geographic and/or time varying variables in order to compare loans while also controlling for the economic environment.

The ACI model can be used as an input into workout and modification programs for when a loan becomes delinquent. For example, for loans that have a high probability of serious delinquency, more aggressive loss mitigation measures may be taken.

The ACI model may also be used to perform counterparty risk analysis. For example, if an entity has business arrangements with a number of different counterparties that perform the same or similar services, the ACI model may be used to compare the relative risks borne by each party. For example, a noteholder of a large portfolio of loans that are serviced by different servicers (or insured by different mortgage insurers, etc.) may use the ACI model to assess the relative risks borne by each of the different servicers in connection with the different loans serviced by each respective servicer. If the analysis reveals that a particular servicer bears a disproportionate share of the risk in connection with the overall portfolio of loans, or if appears that a particular servicer bears too much risk given the overall financial strength of the particular servicer, then corrective measures may be taken.

In an alternative embodiment, a seasoned ACI can be used to account for updated information. Seasoned loans may employ separate treatment to account for differences in the data available for them (e.g. FICO scores at acquisition, payment history, etc.)

As previously noted, additional credit report variables and other data can be used in the creation of ACI. Further, different ACI modeling may be required where the risk factors constitute a structural change. An example of a different ACI model may be sub-prime loans, where different loan variables and historical data may be used.

II. Comparative Loan Performance Analysis

Figure 4:
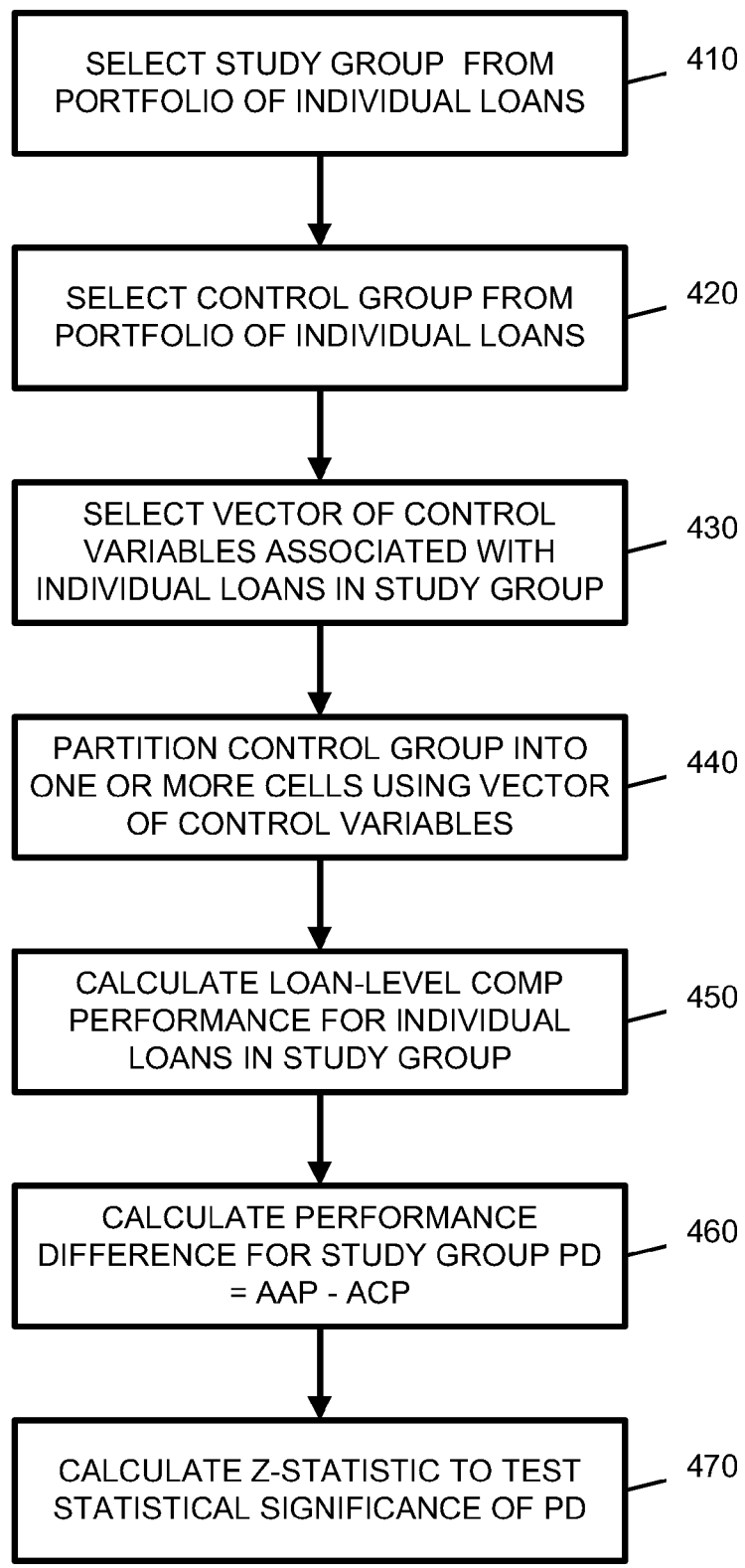
FIG. 4 is a flow diagram depicting a comparative analysis method for evaluating the performance of a particular group of loans relative to the performance of a comparable group of loans according to an exemplary embodiment.
Figure 5:
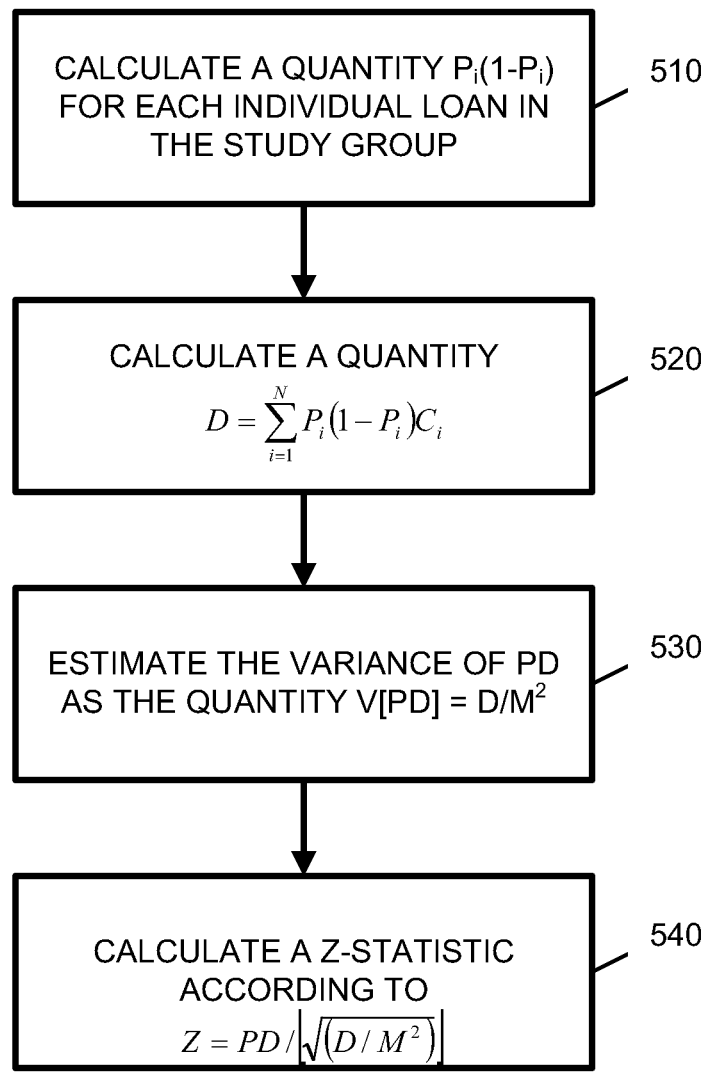
FIG. 5 is a flow diagram depicting the steps involved in calculating a valid Z-statistic for testing the statistical significance of a performance difference according to an exemplary embodiment.
Figure 6:
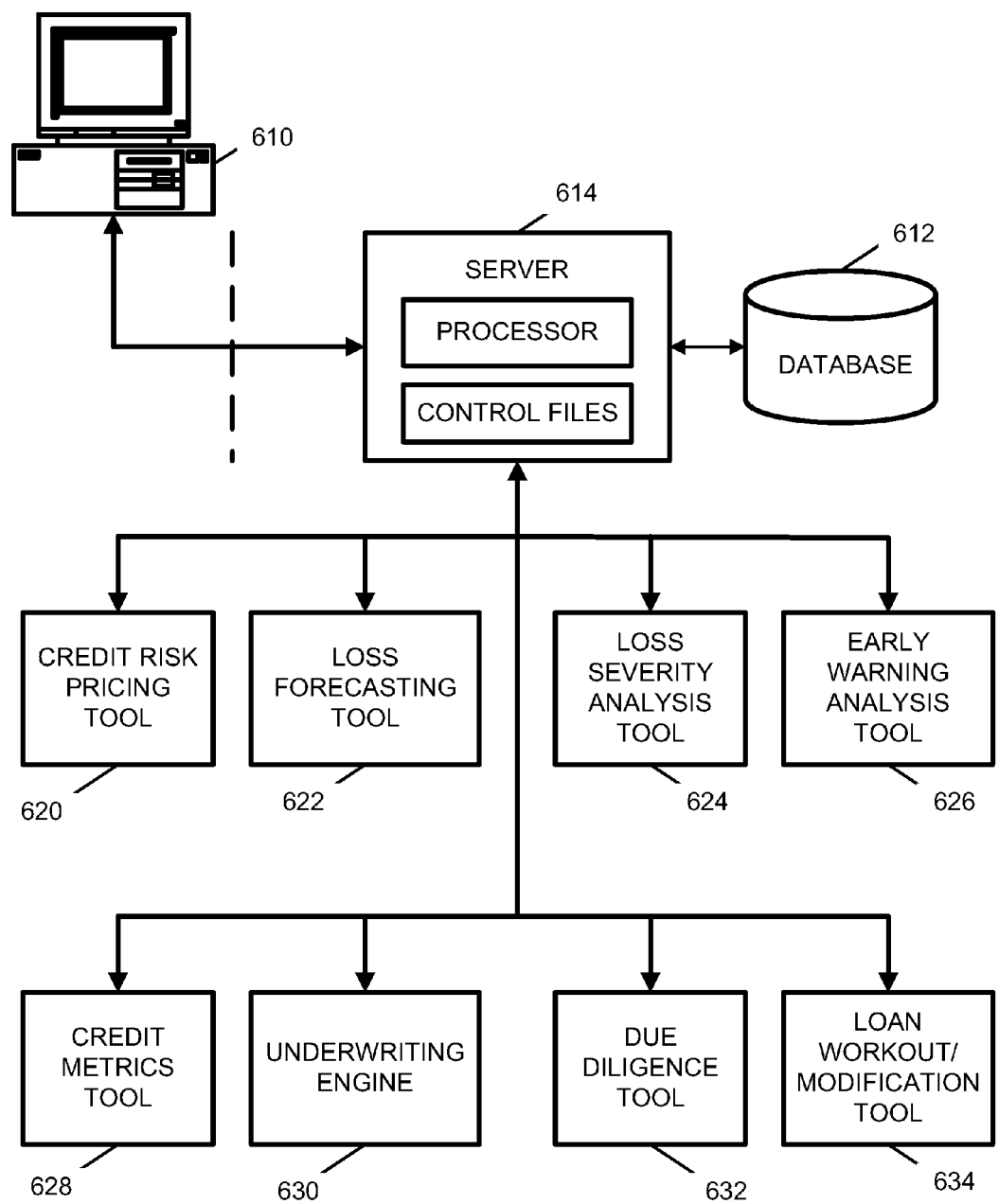
FIG. 6 is a block diagram of a system for assessing loan performance according to an exemplary embodiment.

Turning now to FIGS. 4-5 which illustrate exemplary embodiments with general regard to comparative performance analysis, a system and method are shown which may be used to evaluate the performance of a particular group of loans relative to the performance of a comparable group of loans. In one embodiment, the average actual loan performance of a particular study group of loans is compared with the average estimated, or "comp" performance of another comparable group of loans having the same or similar risk characteristics, which is referred to herein as the control group. Preferably, the average comp performance of the control group is subtracted from the average actual performance of the study group to arrive at a performance difference which is asymptotically normally distributed with mean zero and has a variance that can be estimated. The statistical significance of a non-zero performance difference can thus be tested by calculating a valid Z-statistic for the performance difference and retrieving the critical values using standard tables based on a Gaussian approximation. Further, where it is determined that inaccurate results may result where the loans in the study group are also included in the control group of loans, the performance difference and statistical significance may be calculated after excluding the study group from the control group.

Referring first to FIG. 4, a comparative analysis method for evaluating the performance of a particular group of loans relative to the performance of a comparable group of loans is shown. At step 410, a study group is determined from a portfolio of individual loans. The loans forming the study group may, for example, share a common grouping characteristic. In one exemplary embodiment, all of the loans in the study group have the same or similar product characteristics. In another exemplary embodiment, the loans in the study group have a common documentation type. In yet another exemplary embodiment, all of the loans in the study group are serviced by a common servicer. Still other grouping characteristics are possible. Hereinafter, the variables M, N, and i will be defined differently than in Section I. Specifically, the variable "M" will refer to the number of loans in the study group determined in step 410, and the variable "N" will refer to the total number of loans in the population which includes the M loans in the study group determined in step 410, and the loans in the control group to be determined in step 420. The variable "i" will be used as an indexing variable to refer to a particular loan $L_i$ in the population N which includes the M loans in the study group determined in step 410, and the loans in the control group to be determined in step 420, such that i={1, 2, . . . , N}. As will be explained below, the control group to be determined in step 420 may or may not include the loans in the study group, however, each individual loan $L_i$ is counted only once in the population of N loans as indexed by i, regardless whether the M loans $L_i$ in the study group are further included in the control group. It will be appreciated that variable definitions and equations used herein are merely exemplary and other definitions may be used.

For each of the loans in the portfolio of individual loans, and thus for each of the individual loans in the chosen study group, the actual performance of the loan may be represented by the performance variable $Y_i$. Performance variable $Y_i$ may, for example, be a binary variable that takes on the value of either 0 or 1. In a preferred embodiment, performance variable $Y_i$ is a binary variable which is an indicator for whether the loan is seriously delinquent (SDQ) at a particular time of study, with $Y_i=1$ if the loan is SDQ and $Y_i=0$ if the loan is not SDQ. Alternatively, the performance variable may be used to indicate other binary conditions (e.g., prepayment status or default). Alternatively, $Y_i$ can be a continuous variable. In one alternative embodiment, $Y_i$ is a continuous variable representative of financial loss or profit. However, the test statistic discussed below is the same regardless of the form of $Y_i$.

For each of the individual loans in the portfolio of individual loans, and thus for each of the individual loans in the study group, there are also one or more predetermined control variables $X_k$ commonly associated therewith and a corresponding loan-specific value thereof. The control variables may, for example, include one or more of the explanatory loan variables described in Section I. In one embodiment, the control variables are associated with one or more risk characteristics common to the individual loans in the portfolio. In a preferred embodiment, the control variables include the ACI as described in Section 1 as well as other loan cohort identifiers such as geography and origination period. The nature and role of these control variables will be developed more extensively below. Hereinafter, the variable "k" will be used as an indexing variable to refer to a particular control variable or risk characteristic.

Continuing with step 420, a control group is determined from the portfolio of individual loans. As with the study group, the loans forming the control group may share a common grouping characteristic. For example, the study group may be determined as including only all new loans of a particular loan type, and the control group as including all loans of that particular type.

In step 420, it is also determined whether or not to include the individual loans in the study group within the definition of the control group. In a preferred embodiment, the study group is a subset of the control group. In an alternative embodiment, the control group consists of individual loans that are mutually exclusive from the study group. As will be detailed below, excluding the individual loans in the study group from the control group may be advantageous where the study group would otherwise become a dominant factor in the comparison analysis if included in the control group. The main difference between these two alternatives is in the resulting standard error calculation, which is discussed more extensively below. It will be appreciated that where the control group includes the loans in the study group, the number of loans in the control group will be identical to N, which is the total number of loans under consideration, either as part of the study group, the control group, or both. Each individual loan $L_i$ is indexed only once regardless of whether or not it is included in one or both groups. Alternatively, where the control group is exclusive of the study group, the number of loans in the control group will be given by N-M.

As with the study group, for each of the individual loans in the control group, the actual performance of the loan may be represented by the performance variable $Y_i$. Similarly, for each individual loan in the control group there are also one or more predetermined control variables $X_k$ associated therewith and a corresponding loan-specific value thereof. In an exemplary embodiment, the same performance variable $Y_i$ and control variables $X_k$ are associated with each of the loans $L_i$ in the study group and the control group At step 430, a set of control variables, hereinafter referred to as a vector $X_i$ of K control variables, is determined. Various predictive models and indexing variables may be used. In one embodiment, the definitions of vector $X_i$ and control variables $X_k$ are essentially the same as definitions for the vector $X_m$ and the explanatory variables $X_n$ described in Section I. The vector $X_i$ of K control variables may, for example, be determined to be one or more of the control variables $X_k$ associated with the individual loans $L_i$ in the study group. In one embodiment, the control variables include one or more of the explanatory loan variables described in the previous section detailing Loan Performance Analysis. In one embodiment, the control variables are associated with one or more risk characteristics common to the individual loans in the portfolio. In a preferred embodiment, the control variables include at least eleven of the fourteen exemplary variables described in the previous section detailing Loan Performance Analysis, the eleven variables being Mean FICO, Origination LTV, Credit Premium, Number of Borrowers, Backend Ratio, Reserves, Third Party Organization, Number of Units, Amortization Term, Loan Amount, and Loan Purpose. Where there are K control variables in the vector $X_i$, for each individual loan $L_i$ in the study group, the corresponding vector $X_i$ would be defined as:

$$X_i = [X_{i,1} \ldots X_{i,K}].$$

The entire array of $X_{i,k}$ values can thus be represented as:

$$X_{i,k} = [X_{1,1} \ldots X_{i,K}].$$

$$X_{N,1} \ldots X_{N,K}$$

The control variables are determined to ensure that individual loans in the study group are compared only to those loans in the control group having the same or similar risk characteristics (i.e., to ensure an "apples-to-apples" as opposed to an "apples-to-oranges" comparison between a particular loan $L_i$ in the study group and loans in the control group).

At step 440, the control group is partitioned into one or more smaller cells by the full interaction of the control variables $X_k$ in the vector of K control variables X, selected in step 430. Specifically, the individual loans in each of these cells share the same or similar loan-specific values for each of the control variables $X_k$ included in the vector of K control variables $X_i$. For example, where the vector of control variables $X_i$ includes K=5 control variables $X_k$, a cell may comprise all loans $L_i$ in the control group having the same or similar values for $X_{i,1}, X_{i,2}, \ldots X_{i,5}$. As will be detailed below, these cells serve as the basis for calculating comp performances that are used as benchmarks for individual loans $L_i$ in the study group according to corresponding values of $X_k$. A cell in the control group is a "corresponding cell" to a particular loan in the study group if the individual loans which comprise the cell share the same for similar values of $X_k$ as the individual loan in the study group.

In one exemplary embodiment, the control group is directly partitioned into one or more cells by the vector of K control variables $X_i$. Thus, for each individual loan $L_i$ in the study group, there is potentially a corresponding cell comprising at least one individual loan in the control group wherein the individual loan or loans in the cell share the same or similar loan-specific risk characteristic values for each of the control variables $X_k$ included in the vector of K control variables $X_i$.

In another exemplary embodiment, an imported prediction model is used to partition the control group using the vector of K control variables, as opposed to direct partitioning. An imported prediction model is a statistical model that predicts $Y_i$ for each individual loan in the control group using the vector of K control variables $X_i$ to partition the control group, and has been estimated outside the comparative analysis of Section II. This imported prediction model reduces the K-dimensional space represented by the vector of K control variables $X_k$ into a single dimension representing the predicted probability that $Y_i$ will take on a specified value. Thus, the imported prediction model provides a much more efficient partitioning of the control group, provided, however, that the imported prediction model is a valid model relative to the present comparative analysis. In a preferred embodiment, the control group is partitioned according to an imported ACI model as described above in the section detailing Loan Performance Analysis. Specifically, the ACI-based imported prediction model is an embodiment of ACI which gives a comprehensive probability of SDQ for a loan and is a function of the following eleven variables: Mean FICO, Origination LTV, Credit Premium, Number of Borrowers, Backend Ratio, Reserves, Third Party Organization, Number of Units, Amortization Term, Loan Amount, and Loan Purpose. The imported ACI model may also incorporate normalization variables such as Region and Acquisition Quarter to provide a comprehensive probability of early warning (EW) delinquency as a function of the eleven static risk factors known at acquisition.

The composition of each of the cells further depends on whether or not the individual loans $L_i$ in the study group are included in the control group in step 420. In a preferred embodiment, the individual loans in the study group are included in the control group in step 420. In this embodiment, the notation $A_i$ is hereinafter used to define a cell of the control group corresponding to an individual loan $L_i$ in the study group, wherein the cell is comprised of all loans in a control group inclusive of the study group that share the same or similar loan-specific risk characteristic values for each of the control variables $X_k$ included in the vector of K control variables $X_i$. In an alternative embodiment, the individual loans $L_i$ in the study group are excluded from the control group in step 420. In this embodiment, the notation $B_i$ is hereinafter used to define a cell of the control group corresponding to an individual loan $L_i$ in the study group, wherein the cell is comprised of all loans in a control group exclusive of the study group that share the same or similar loan-specific risk characteristic values for each of the control variables $X_k$ included in the vector of K control variables $X_i$.

Continuing with step 450, a loan-level comp performance value $P_i$ is calculated for each of the individual loans in the study group. The loan level comp performance $P_i$, serves as an estimator of $Y_i$ for a particular loan in the study group and is typically determined within a control group that is larger than the study group.

The exact method of calculation of $P_i$ depends on whether or not the individual loans in the study group are included in the control group in step 420. Hereinafter, the variable $\hat{Y}_i$ will be substituted for $P_i$ where the control group is inclusive of the study group, and the variable $\tilde{Y}_i$ will be substituted for $P_i$ where the control group is exclusive of the study group. The variable $C_i$ will further be used as an indicator of whether an individual loan $L_i$ in the control group belongs in the study group. In one embodiment, $C_i$ is a binary variable that takes on the value 1 when the individual loan $L_i$ is included in the study group, and the value 0 when the individual loan $L_i$ is not in the study group. The size of the study group is accordingly given by:

$$M = \Sigma_{i=1}^{N} C_i \qquad \text{Eq. (15)}.$$

In one exemplary embodiment, the individual loans in the study group are included in the control group in step 420, the control group is directly partitioned into one or more cells by the vector of K control variables $X_i$ in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. $\hat{Y}_i$ is the loan-level comp probability that $Y_i=1$ and represents the average $Y_i$ over the cell $A_i$ where $|A_i|$ is the number of loans in $A_i$. For purposes of indexing within a particular cell $A_i$, "j" is substituted for "i," and $\hat{Y}_i$ can thus be expressed as:

$$\hat{Y}_i = \frac{1}{|A_i|} \sum_{j \in A_i} Y_j. \qquad \text{Eq. (16)}$$

In another exemplary embodiment, the individual loans in the study group are excluded from the control group in step 420, the control group is directly partitioned into one or more cells by the vector of K control variables $X_i$ in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. $\tilde{Y}_i$ is the loan-level comp probability that $Y_i=1$ and represents the average $Y_i$ over the cell $B_i$ where $|B_i|$ is the number of loans in $B_i$. For purposes of indexing within a particular cell $A_i$, "j" is substituted for "i," and $\tilde{Y}_i$ can thus be expressed as:

$$\tilde{Y}_i = \frac{1}{|B_i|} \sum_{j \in B_i} Y_j. \qquad \text{Eq. (17)}$$

In a preferred embodiment, the individual loans in the study group are included in the control group in step 420, the control group is partitioned by a valid imported prediction model, such an imported ACI model, in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. The loan-level comp performance, $P_i$, for each individual loan in the study group is provided by the imported prediction model.

In step 460, a performance difference (PD) is calculated for the study group. The performance difference compares the average actual performance (AAP) by the individual loans in the study group with the average comp performance (ACP). AAP is the average value of $Y_i$ over the entire study group and can be expressed as:

$$\text{AAP} = M^{-1} \Sigma_{i=1}^{N} C_i Y_i \qquad \text{Eq. (18)}.$$

ACP is the average of the loan-level comp probabilities over the entire study group and can be generally expressed as:

$$\text{ACP} = M^{-1} \Sigma_{i=1}^{N} C_i P_i \qquad \text{Eq. (19)}.$$

PD is the difference between AAP and ACP and can thus be generally expressed as:

$$\text{PD} = \text{AAP} - \text{ACP} = (M^{-1} \Sigma_{i=1}^{N} C_i Y_i) - (M^{-1} \Sigma_{i=1}^{N} C_i P_i) \qquad \text{Eq. (20)}.$$

As may be appreciated, PD provides a valid test statistic under the assumption that the study group is not different from the rest of the loans in the comp analysis beyond the effects of the control variables $X_k$ in the vector of K control variables $X_i$, such that if two individual loans share the same values for each $X_k$, they share the same probability of a particular value of $Y_i$. Under this assumption, $P_i$ is a sufficient estimator of the probability that $Y_i$ will take on a specified value. Given the further assumption that the individual loan performances $Y_i$ are independent from one another, and provided that the study group is large enough, central limit theorem supports the conclusion that PD is asymptotically normally distributed with mean zero and has a variance that can be estimated using $P_i$. Thus, as will be shown below, PD facilitates the use of standard tables based on a Gaussian approximation in evaluating the statistical significance of a non-zero difference between AAP and ACP.

The exact method of calculation of PD depends on whether or not the individual loans in the study group are included in the control group in step 420. In one exemplary embodiment, the individual loans in the study group are included in the control group in step 420, the control group is directly partitioned into one or more cells by the vector of K control variables $X_i$ in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. Accordingly, $\hat{Y}_i$ from Eq. (16) can be substituted for $P_i$ in Eq. (20) to yield:

$$PD_1 = \frac{1}{M}\sum_{i=1}^{N}[Y_i - \hat{Y}_i]C_i. \quad \text{Eq. (21)}$$

In another exemplary embodiment, the individual loans in the study group are excluded from the control group in step 420, the control group is directly partitioned into one or more cells by the vector of K control variables, $X_i$, in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. Accordingly, $\tilde{Y}_i$ from Eq. (17) can be substituted for $P_i$ in Eq. (20) to yield:

$$PD_2 = \frac{1}{M}\sum_{i=1}^{N}[Y_i - \tilde{Y}_i]C_i. \quad \text{Eq. (22)}$$

In a preferred embodiment, the individual loans in the study group are included in the control group in step 420, the control group is partitioned by a valid imported prediction model, such as an imported ACI model, in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. The loan-level comp performance $P_i$ for each individual loan in the study group is provided by the imported prediction model and Eq. (20) is used to calculate PD.

In step 470, the statistical significance of PD may be tested. Unless the grouping characteristic that defines the study group is one of the variables $X_k$ in the vector of K control variables $X_i$, the value of PD is generally not zero. As stated above, PD is asymptotically normally distributed with mean zero and has a variance that can be estimated. As such, a valid Z-statistic with a standard normal distribution can be calculated for PD based on a Gaussian approximation. In one embodiment, the standard error of PD is retrieved using standard tables based on a Gaussian approximation.

Referring now to FIG. 5, the steps involved in calculating a valid Z-statistic for testing the statistical significance of a non-zero PD are shown for the case where the individual loans in the study group are included in the control group in step 420. In step 510, a quantity $P_i(1-P_i)$ is calculated, where $P_i$ is the loan-level comp performance for an individual loan $L_i$ in the study group.

At step 520, a quantity D representing the sum of each quantity $P_i(1-P_i)$ in step 510 is calculated over the study group according to:

$$D = P_{i=1}^{N} P_i[1-P_i]C_i \quad \text{Eq. (23).}$$

At step 530, the assumption that the individual loan performances $Y_i$ are independent from one another allows the variance of PD to be estimated by a quantity $D/M^2$. The variance of PD is given by:

$$V[PD] = \frac{1}{M^2}\sum_{i=1}^{N} P_i[1-P_i]C_i. \quad \text{Eq. (24)}$$

At step 540, a Z-statistic with standard normal distribution is calculated according to:

$$Z = PD/[\sqrt{(D/M^2)}] \quad \text{Eq. (25).}$$

In one exemplary embodiment, the individual loans in the study group are included in the control group in step 420, the control group is directly partitioned into one or more cells by the vector of K control variables $X_i$ in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. $P_1$ is calculated using Eq. (21). Substituting $\hat{Y}_i$ from Eq. (16) for $P_i$ in Eq. (24) yields:

$$V[PD_1] = \frac{1}{M^2}\sum_{i=1}^{N} \frac{|A_i|-1}{|A_i|}\hat{Y}_i[1-\hat{Y}_i]C_i. \quad \text{Eq. (26)}$$

When the study group is only a small fraction of the whole population and $|A_i|$ is sufficiently large, the ratio $(|A_i|-1)/|A_i|$ is very close to 1. Therefore, $V[PD_1]$ can be approximated by replacing the ratio with 1 in Eq. (26), which becomes identical to Eq. (24) with $\hat{Y}_i$ substituted for $P_i$. The statistical significance of $PD_1$ is calculated according to steps 510-540.

In another exemplary embodiment, the individual loans in the study group are excluded from the control group in step 420, the control group is directly partitioned into one or more cells by the vector of K control variables $X_i$ in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. $PD_2$ is calculated using Eq. (22). Substituting $\tilde{Y}_i$ from Eq. (17) for $P_i$ in Eq. (24) yields:

$$V[PD_2] = \frac{1}{M^2}\sum_{i=1}^{N} \frac{|B_i|-1}{|B_i|}\tilde{Y}_i[1-\tilde{Y}_i]C_i. \quad \text{Eq. (27)}$$

Because the study group might not be a small fraction of the whole population, $|B_i|$ is not necessarily sufficiently large to render the ratio $(|B_i|+1)/|B_i|$ sufficiently close to 1. Where this is the case, the ratio $(|B_i|+1)/|B_i|$ is not replaced with 1 in Eq. (27). The statistical significance of $PD_2$ is calculated according to steps 510-540, substituting Eq. (27) for Eq. (24).

In a preferred embodiment, the individual loans in the study group are included in the control group in step 420, the control group is partitioned by a valid imported prediction model, such as an imported ACI model, in step 440, and $Y_i$ is a binary variable which is an indicator for whether the loan is seriously delinquent (SDQ) at a particular time of study, with $Y_i=1$ if the loan is SDQ and $Y_i=0$ if the loan is not SDQ. The loan-level comp performance $P_i$ for each individual loan in the study group is provided by the imported prediction model and Eq. (20) is used to calculate PD. The statistical significance of PD is calculated according to steps 510-540.

Referring again to step 420 in FIG. 1, it may be appreciated that excluding the individual loans in the study group from the control group is advantageous where the study group becomes a dominant factor in some cells $A_i$ and the comparative analysis is essentially comparing the performance of the study group with itself. Defining the study group and the control group to be mutually exclusive avoids this result. However, if the resulting cells $B_i$ are empty or near empty, an imprecise estimate of $\tilde{Y}_i$ in Eq. (17) may result. Furthermore, because of the potential difference between the size of $|A_i|$ and $|B_i|$, the variance estimate given by Eq. (26) may be more accurate than that given by Eq. (27). Where Eq. (27) is used, the ratio $(|B_i|+1)/|B_i|$ is retained in the calculation.

The disclosed method and system for assessing the performance of a particular group of loans with respect to the performance of another comparable group of loans provides many advantages. The use of a performance difference provides a test statistic that is easy to characterize, facilitates the use of standard probability tables, and does not require access to specialized statistical software or an advanced knowledge of statistical theory. Furthermore, the option of defining the control group and the study group to be mutually exclusive eliminates inaccuracies created when the study group becomes a dominant factor in some cells in the control group.

The processes and systems described in Sections I-II may be embodied as program logic and data in a programmed computer 610. Loan data may be downloaded from a database 612 associated with a server system 614 and stored in the computer 610 for operator analysis. The computer 610 may include a screen display and operator input device (e.g., keyboard), along with other financial analysis tools, to allow data in the model to be manipulated and to allow outputs of the modeled to be viewed, stored, and communicated to other systems. Loan data may include, for example, a list of individual loans, with each individual loan having one or more sortable data fields associated therewith. The sortable data fields may include, for example, information related to particular grouping characteristics associated with each individual loan. Such grouping characteristics may include, for example, one or more product characteristics associated with each loan, the documentation type of each loan, or the loan servicer associated with each individual loan. The sortable data fields may further include the control variables associated with each of the individual loans. The control variables may include, for example, one or more of the explanatory loan variables described in Section I, or one or more risk characteristics associate with each of the individual loans in the portfolio. The sortable data fields may be used in conjunction with program logic to determine the study group in response to one or more user inputs regarding a common grouping characteristic. The sortable data fields may further be employed to determine the control group. For example, the control group may be determined automatically according to an optimization operation, such as a linear regression operation or other operation. Alternatively, the control group may be determined in response to user input regarding the common grouping characteristic associated with the study group, a different grouping characteristic, or a combination thereof. The sortable data fields may also be used to determine the vector of control variables. For example, the vector of control variables may be determined automatically according to an optimization operation, such as a linear regression operation or other operation. Alternatively, the vector of control variables may be determined in response to user input. The program logic may additionally determine whether to exclude the study group from or include the study group in the control group. For example, the program logic may analyze the individual loans in each cell to determine whether an excessive number of individual loans from the study group is present, or whether excluding the individual loans in the study group from the control group would result in an excessive number of empty cells or cells otherwise containing an insufficient number of loans to provide an accurate estimate. In response to the analysis, the program logic may, for example, automatically determine whether to exclude the study group from or include the study group in the control group. Additionally or alternatively, the program logic may output a message or warning indicating the results of the analysis. Output from the program logic may also be transmitted to other engines or tools connected to or implemented by the server 614, such as a credit risk pricing tool 620, a loss forecasting tool 622, a loss severity analysis tool 624, an early warning portfolio analysis tool 626, a credit metrics tool 628, an automated underwriting engine 630, one or more due diligence tools 632, one or more loan workout and modification tools 634, and so on, as discussed above in Section I.

While the exemplary embodiments illustrated in the figures and described above are presently preferred, it should be understood that these embodiments are offered by way of example only. Other embodiments may include, for example, variables or combinations of variables. Further, while some exemplary embodiments describe the invention in the context of a business operating in the mortgage market, the invention may extend to other kinds of businesses or enterprises. The invention is not limited to a particular embodiment, but extends to various modifications, combinations, and permutations that nevertheless fall within the scope and spirit of the appended claims.

What is claimed is:

1. Machine-readable non-transitory media having stored therein a set of instructions that when executed cause a computer to implement a process for evaluating the performance of a study group of loans relative to the performance of a control group of loans, the process comprising:

determining a study group from a portfolio of individual loans, each of the individual loans in the portfolio having a performance variable associated therewith and a corresponding loan-specific value thereof, wherein the loan-specific performance variable value indicates delinquency and/or default of an individual loan;

determining a control group from the portfolio of individual loans;

determining a set of control variables associated with each of the individual loans included in the study group and the control group, wherein at least one control variable in the set of control variables indicates an estimated loan-specific performance value;

partitioning the control group into one or more cells based on the set of control variables, wherein each cell includes one or more loans with similar loan specific values for each of the control variables in the set of control variables, and wherein each individual loan in the study group shares similar values with at least some of the control variables associated with each loan in at least one corresponding cell from the one or more cells;

calculating an estimated performance value for each of the individual loans in the study group based on the control variables values indicating estimated loan-specific performance associated with loans of the at least one corresponding cell associated with the individual loan in the study group;

calculating a performance difference for the study group, wherein the performance difference comprises the difference between an average of the loan-specific performance variable value for each individual loan in the study group and an average of the estimated performance value for each individual loan in the study group; and storing the calculated performance difference in a database.

2. The machine-readable non-transitory media of claim 1, wherein the control group is inclusive of the study group.

3. The machine-readable non-transitory media of claim 1, wherein the control group and the study group are mutually exclusive.

4. The machine-readable non-transitory media of claim 1, wherein the performance variable is a binary variable.

5. The machine-readable non-transitory media of claim 1, wherein the performance variable is a continuous variable.

6. The machine-readable non-transitory media of claim 1, wherein the estimated performance value for each individual loan in the study group comprises the average of the loan-specific performance variable values associated with each of the individual loans in the corresponding cell.

7. The machine-readable non-transitory media of claim 1, wherein an imported prediction model is used in partitioning the control group and in calculating the estimated performance value for each of the cells.

8. The machine-readable non-transitory media of claim 1, wherein the process further comprising the step of testing the statistical significance of the performance difference.

9. Machine-readable non-transitory media having stored therein a set of instructions that when executed cause a computer to implement a process for evaluating the performance of a study group of loans relative to the performance of a control group of loans, the process comprising:

determining a study group, the study group comprising a first grouping of loans having a common grouping characteristic and being selected from a portfolio of individual loans, each of the individual loans in the portfolio having a performance variable associated therewith and a corresponding loan-specific value thereof, and one or more control variables associated therewith and corresponding loan-specific values thereof, wherein the loan-specific performance variable value indicates delinquency and/or default of an individual loan;

determining a control group, the control group comprising a second grouping of loans selected from the portfolio of individual loans;

determining a set of control variables, the set of control variables comprising one or more of the one or more control variables associated with each of the individual loans included in the study group, wherein at least one control variable in the set of control variables indicates an estimated loan-specific performance value;

partitioning the control group into one or more cells, each cell comprising the individual loans in the control group having the same or similar loan-specific control variable values for each of the control variables included in the set of control variables, wherein each individual loan in the study group shares similar values with at least some of the control variables associated with each loan in at least one corresponding cell from the one or more cells;

calculating an estimated performance value for each of the individual loans in the study group based on the control variables values indicating estimated loan-specific performance associated with loans of the at least one corresponding cell associated with the individual loan in the study group;

calculating a performance difference for the study group, the performance difference comprising the difference between an average of the loan-specific performance variable value for each individual loan in the study group and an average of the estimated performance value for each individual loan in the study group; and storing the calculated performance difference in a database.

10. The machine-readable non-transitory media of claim 9, wherein the control group is inclusive of the study group.

11. The machine-readable non-transitory media of claim 9, wherein the control group and the study group are mutually exclusive.

12. The machine-readable non-transitory media of claim 9, wherein the performance variable is a binary variable.

13. The machine-readable non-transitory media of claim 9, wherein the performance variable is a continuous variable.

14. The machine-readable non-transitory media of claim 9, wherein the estimated performance value for each individual loan in the study group comprises the average of the loan-specific performance variable values associated with each of the individual loans in the corresponding cell.

15. The machine-readable non-transitory media of claim 9, wherein an imported prediction model is used in partitioning the control group and in calculating the estimated performance value for each of the cells.

16. The machine-readable non-transitory media of claim 9, wherein the process further comprising the step of testing the statistical significance of the performance difference.

17. A computer-implemented system configured to evaluate the performance of a study group of loans relative to the performance of a control group of loans, the system comprising:

memory including loan variable data for a portfolio of individual loans, wherein the load variable data includes a performance variable for each of the individual loans and a corresponding loan-specific value thereof, and wherein the loan-specific performance variable value indicates delinquency and/or default of an individual loan; and a processor coupled to the memory and operable to execute programmed instructions, wherein the programmed instructions:

A. determine a study group from the portfolio of individual loans;

B. determine a control group from the portfolio of individual loans;

C. determine a set of control variables associated with each of the individual loans included in the study group and the control group, wherein at least one control variable in the set of control variables indicates an estimated loan-specific performance value;

D. partition the portfolio of individual loans into one or more cells based on the set of control variables, wherein each cell includes one or more loans with similar loan specific values for each of the control variables in the set of control variables, and wherein each individual loan in the study group shares similar values with at least some of the control variables associated with each loan in at least one corresponding cell from the one or more cells;

E. calculate an estimated performance value for each of the individual loans in the study group based on the control variables values indicating estimated loan-specific performance associated with loans of the at least one corresponding cell associated with the individual loan in the study group; and F. calculate a performance difference for the study group; wherein the performance difference comprises the difference between an average of the loan-specific performance variable value for each individual loan in the study group and an average of the estimated performance value for each individual loan in the study group.

18. The system of claim 17, wherein the loan variable data includes a loan-specific performance variable value associated with each of the individual loans in the portfolio, and further includes one or more control variables associated with each of the individual loans in the portfolio, and wherein the vector of control variables comprises one or more of the control variables associated with each of the individual loans in the portfolio.

19. The system of claim 18, wherein the loan-specific performance value is a binary variable.

20. The system of claim 18, wherein the loan-specific performance variable is a continuous variable.

21. The system of claim 18, wherein the estimated performance value for each of the individual loans in the study group comprises the average of the loan-specific performance variable values associated with each of the individual loans in the corresponding cell.

22. The system of claim 18, wherein an imported prediction model is utilized in partitioning the portfolio of individual loans into one or more relevant cells and in calculating the estimated performance value for each of the cells.

23. The system of claim 18, wherein the control group is inclusive of the study group.

24. The system of claim 18, wherein the control group and the study group are mutually exclusive.

25. The system of claim 18, wherein the programmed instructions further test the statistical significance of the performance difference.

26. Machine-readable non-transitory media having stored therein a set of instructions that when executed cause a computer to implement a process for evaluating the performance of a study group of loans relative to the performance of a control group of loans, the process comprising:

determining a study group from a portfolio of individual loans; each of the individual loans in the portfolio having a performance variable associated therewith and a corresponding loan-specific value thereof;

determining a control group from the portfolio of individual loans; the control group being exclusive of the study group;

determining a set of control variables associated with each of the individual loans included in the study group and the control group, wherein at least one control variable in the set of control variables indicates an estimated loan-specific performance value;

partitioning the control group into one or more cells based on the set of control variables, wherein each cell includes one or more loans with similar loan specific values for each of the control variables in the set of control variables, and wherein each individual loan in the study group shares similar values with at least some of the control variables associated with each loan in at least one corresponding cell from the one or more cells;

calculating an estimated performance value for each of the individual loans in the study group based on the control variables values indicating estimated loan-specific performance associated with loans of the at least one corresponding cell associated with the individual loan in the study group;

calculating a performance difference for the study group; wherein the performance difference comprises the difference between: (i) the study group size multiplied by the summation of: (a) the average values of the loan-specific performance variable multiplied by (b) the number of loan-specific performance variables included in the average value of the loan-specific performance variable and (ii) the study group size multiplied by the summation of: (a) the average values of the estimated performance value for each individual loan in the study group multiplied by (b) the number estimated performance values included in the average value of the estimated performance value; and storing the calculated performance difference in a database.

* * * * *